US009286278B2

(12) United States Patent
Nakamura et al.

(10) Patent No.: US 9,286,278 B2
(45) Date of Patent: Mar. 15, 2016

(54) RANGE-BASED TEXT EDITING

(71) Applicant: International Business Machines Corporation, Armonk, NY (US)

(72) Inventors: Koichoi Nakamura, Kanagawa (JP); Yuko Naruse, Tama (JP)

(73) Assignee: International Business Machines Corporation, Armonk, NY (US)

( * ) Notice: Subject to any disclaimer, the term of this patent is extended or adjusted under 35 U.S.C. 154(b) by 523 days.

(21) Appl. No.: 13/675,221

(22) Filed: Nov. 13, 2012

(65) Prior Publication Data

US 2013/0132832 A1    May 23, 2013

(30) Foreign Application Priority Data

Nov. 17, 2011    (JP) .................................. 2011-251850

(51) Int. Cl.
*G06F 17/24*    (2006.01)
(52) U.S. Cl.
CPC ...................................... *G06F 17/24* (2013.01)
(58) Field of Classification Search
CPC .  G06F 17/274; G06F 17/289; G06F 17/2785; G06F 3/04842; H04N 1/0035
USPC ................... 715/271, 256; 704/4, 9
See application file for complete search history.

(56) References Cited

U.S. PATENT DOCUMENTS

| 5,694,523 | A | * | 12/1997 | Wical ............................... 706/45 |
| 5,708,822 | A | * | 1/1998 | Wical ................................ 704/1 |
| 2009/0043563 | A1 | * | 2/2009 | Bode et al. ......................... 704/3 |
| 2010/0145676 | A1 | | 6/2010 | Rogers | |
| 2012/0036181 | A1 | * | 2/2012 | Isidore .......................... 709/203 |

FOREIGN PATENT DOCUMENTS

| JP | 05128110 A | 10/1991 |
| JP | 07121526 A | 5/1995 |
| JP | 08095969 A | 4/1996 |
| JP | 08235219 A | 9/1996 |
| JP | 08339368 A | 12/1996 |
| JP | H0339368 A | 12/1996 |

(Continued)

OTHER PUBLICATIONS

MSWord2010 (screen shots).*
MSWord2010_Release_notes.*
Christian Godefroy, "How to Write Letters that Sell", published 2001.*
Tsuda, K., et al., "A Method for Reducing Texts for the Japanese Text Proofreading System," IEEE Technical Report, vol. 91, No. 71, pp. 9-16, May 1991.

(Continued)

*Primary Examiner* — Cesar Paula
*Assistant Examiner* — Jian Huang
(74) *Attorney, Agent, or Firm* — Cantor Colburn LLP; Rahan Uddin

(57) ABSTRACT

Embodiments relate to text editing. An aspect includes changing a first word or phrase in a sentence for a second word or phrase while maintaining semantic content of the first word or phrase and such that the sentence falls within a predetermined range by, in response to the second word or phrase having more characters or words than the first word or phrase, changing a third word or phrase within the sentence for a fourth word or phrase, such that the sentence falls within the predetermined range; and in response the second word or phrase having fewer characters or words than the first word or phrase, changing a fifth word or phrase within the sentence for a sixth word or phrase, such that the sentence falls within the predetermined range. Another aspect includes displaying the sentence including the second word or phrase on the display screen.

20 Claims, 20 Drawing Sheets

(56) References Cited

FOREIGN PATENT DOCUMENTS

| | | |
|---|---|---|
| JP | 11143869 A | 5/1999 |
| JP | 2000048025 A | 2/2000 |
| JP | 2000057145 A | 2/2000 |
| JP | 2000163412 | 6/2000 |
| JP | 2004302900 A | 10/2004 |
| JP | 2006331429 A | 12/2006 |

OTHER PUBLICATIONS

Tsuda, K., et al., "Method of Reducing Texts by Using Morpheme Replacements," The Transactions of the Institute of Electronics, Information and Communication Engineers D-II, vol. J75-D-2, No. 3, pp. 619-627, 1992.

* cited by examiner

FIGURE 3A

A. TEXT BEING EDITED 301

- - - - - - -
Generally speaking, to draw up and submit a better disclosure of invention, inventors need to clearly explain by using specific samples that show clear processes in order to allow persons who evaluate the invention to understand the practicability of their own original idea.
- - - - - - -

B. SELECT PORTION TO APPLY EDITING 302

- - - - - - -
Generally speaking, to draw up and submit a better disclosure of invention, inventors need to clearly explain by using specific samples that show clear processes in order to allow persons who evaluate the invention to understand the practicability of their own original idea.
- - - - - - -

C. SETTING DISPLAY RANGE

1. DECREASE THE NUMBER OF LINES  311

> Generally speaking, to draw up and submit a better disclosure of invention, inventors need to clearly explain by using specific samples that show clear processes in order to allow persons who evaluate the invention to understand the practicability of their own original idea.

↘ 312

2. INCREASE THE NUMBER OF LINES  313

> Generally speaking, to draw up and submit a better disclosure of invention, inventors need to clearly explain by using specific samples that show clear processes in order to allow persons who evaluate the invention to understand the practicability of their own original idea.

↘ 314

3. CHANGE (MOVE) DISPLAY RANGE  315

> Generally speaking, to draw up and submit a better disclosure of invention, inventors need to clearly explain by using specific samples that show clear processes in order to allow persons who evaluate the invention to understand the practicability of their own original idea.

D. CHANGING ONE WORD/PHRASE OR ONE COMBINATION OF WORD(S)/PHRASE(S) (WORD/PHRASE OPTIMIZATION)

1. DECREASE THE NUMBER OF LINES  321

*Generally*, to draw up and submit a better disclosure of invention, inventors *must clearly explain by tactically using examples of clear processes* in order to allow evaluators to understand the *feasibility* of *their invention*.

2. INCREASE THE NUMBER OF LINES  323

Generally speaking, to draw up and submit *a better disclosure statement of invention*, inventors *need to allow persons who evaluate and determine the feasibility* of the *inventors'* idea *to correctly understand* the idea. *To that end*, the inventors need to *clearly explain by tactically using examples* that show clear processes.

3. CHANGE (MOVE) DISPLAY AREA  325

*Generally*, to draw up and submit a better disclosure of invention, inventors *must* clearly explain *using examples of clear processes* in order to allow evaluators to understand the *feasibility* of the *inventors' invention*.

GRAPHIC OBJECT

FIGURE 3E

F. ADJUSTING ONE CHANGED WORD/PHRASE OR ONE CHANGED
COMBINATION OF WORD(S)/PHRASE(S)

2. INCREASE THE NUMBER OF LINES

342

| Persons who evaluate |
|---|
| evaluators |
| in-house evaluators |
| the department of intellectual property |
| the patent firm |
| their manager |
| patent attorneys |
| their supervisor |

A. SELECT ONE SHORT WORD/PHRASE

341

■ ■ ■ ■ ■ ■
Generally speaking, to draw up and submit *a better disclosure statement of invention*, inventors *must* allow *persons who evaluate and determine* the *feasibility* of the *inventors'* idea to *correctly understand* the feasibility. *To that end*, the inventors need to *clearly explain by tactically using examples* that show clear processes.
■ ■ ■ ■ ■ ■ ■

B. AFTER SELECTION 344
need to

343

■ ■ ■ ■ ■ ■
Generally speaking, to draw up and submit *a better disclosure statement of invention*, inventors must allow *evaluators to correctly understand* the *feasibility* of the inventors' idea. *To that end*, the inventors need to *clearly explain by tactically using examples* *that show clear processes*.
■ ■ ■ ■ ■ ■ that show clear and easily understandable processes  344

C. AUTOMATIC ADJUSTMENT OF THE NUMBER OF LINES        345

■ ■ ■ ■ ■ ■
Generally speaking, to draw up and submit *a better disclosure statement of invention*, inventors *need* to allow *evaluators to correctly understand* the feasibility of the *inventors'* idea. *To that end*, the inventors need to *clearly explain by tactically using examples* *that show clear and easily understandable processes*.
■ ■ ■ ■ ■ ■

FIGURE 4A

A. TEXT BEING EDITED
401

- - - - - - -
Generally speaking, to draw up and submit a better disclosure of an invention, it is required for inventors that the original idea will be explained by using samples which show clear processes to let evaluators understand its expected implementation.
- - - - - - -

B. SELECT PORTION TO APPLY EDITING
402

- - - - - -
[Generally speaking, to draw up and submit a better disclosure of an invention, it is required for inventors that the original idea will be explained by using samples which show clear processes to let evaluators understand its expected implementation.]
- - - - - - -

C. SETTING DISPLAY RANGE

1. DECREASE THE NUMBER OF LINES

411

> Generally speaking, to draw up and submit a better disclosure of an invention, it is required for inventors that the original idea will be explained by using samples which show clear processes to let evaluators understand its expected implementation.

→ 412

2. INCREASE THE NUMBER OF LINES

413

Generally speaking, to draw up and submit a better disclosure of an invention, it is required for inventors that the original idea will be explained by using samples which show clear processes to let evaluators understand its expected implementation.

→ 414

3. CHANGE (MOVE) DISPLAY RANGE

415

Generally speaking, to draw up and submit a better disclosure of an invention, it is required for inventors that the original idea will be explained by using samples which show clear processes to let evaluators understand its expected implementation.

D. CHANGING ONE WORD/PHRASE OR ONE COMBINATION OF WORD(S)/PHRASE(S) (WORD/PHRASE OPTIMIZATION)

1. DECREASE THE NUMBER OF LINES

421

> Generally speaking, to draw up and submit a better disclosure of an invention, it is required for inventors that the *invention* will be explained by using samples which *demonstrate* clear processes to let evaluators *find* its *feasibility*.

2. INCREASE THE NUMBER OF LINES

423

> Generally speaking, *in order to* draw up and submit a better disclosure of an invention, it is required for *the persons who invent the idea* that the original idea will be explained by using samples which *demonstrate* clear processes to let *persons who estimate officially the worth or value or quality of it* understand its *feasibility*.

3. CHANGE (MOVE) DISPLAY AREA

425

| PHOTOGRAPH | *Generally*, to draw up and submit a better disclosure of an invention, it is required for *persons* that the *invention* will be explained *with* samples which *demonstrate* clear processes to let evaluators find its *feasibility*. |
|---|---|

FIGURE 4D

E. ADJUSTING ONE CHANGED WORD/PHRASE OR ONE CHANGED COMBINATION OF WORD(S)/PHRASE(S)

1. DECREASE THE NUMBER OF LINES

432

| expected implementation |
| viability |
| usefulness |
| workability |
| practicability |
| implementation |
| feasibility study |

A. SELECT ONE LONG WORD/PHRASE

431

• • • • • • •

Generally speaking, to draw up and submit a better disclosure of an invention, it is required for inventors that the *invention* will be explained by using samples which *demonstrate* clear processes to let evaluators *find* its feasibility.

• • • • • • •

B. AFTER SELECTION to make  434

433

• • • • • • •

Generally speaking, to draw up and submit a better disclosure of an invention, it is required for inventors that the *invention* will be explained by using samples which *demonstrate* clear processes to let evaluators *find* its expected implementation.

• • • • • • •

C. AUTOMATIC ADJUSTMENT OF THE NUMBER OF LINES inventor is required that  434

435

• • • • • • •

Generally speaking, to *make* and submit a better disclosure of an invention, inventors are required that the *invention* will be explained by using samples which *demonstrate* clear processes to let evaluators *find* its *expected implementation*.

F. ADJUSTING ONE CHANGED WORD/PHRASE OR ONE CHANGED
   COMBINATION OF WORD(S)/PHRASE(S)

2. INCREASE THE NUMBER OF LINES

442

| show |
| indicate |
| present |
| exhibit |
| offer |

A. SELECT ONE SHORT
   WORD/PHRASE

441

........
Generally speaking, *in order to* draw up and submit a better disclosure of an invention, it is required *for the persons who invent the idea* that the original idea will be explained by using samples which *demonstrate* clear processes to let *persons who estimate officially the worth or value or quality of it* understand its *feasibility*.
........

B. AFTER SELECTION 444 (A plurality of samples)

443

........
Generally speaking, *in order to* draw up and submit a better disclosure of an invention, it is required *for the persons who invent the idea* that the original idea will be explained by using *samples* which *show* clear processes to let *persons who estimate officially the worth or value or quality of it* understand its *feasibility*.
........

C. AUTOMATIC ADJUSTMENT OF THE NUMBER OF LINES

445

........
Generally speaking, *in order to* draw up and submit a better disclosure of an invention, it is required *for the persons who invent the idea* that the original idea will be explained by using *a plurality of samples* which *show* clear processes to let *persons who estimate officially the worth or value or quality of it* understand its *feasibility*.
........

| ID | WORD/PHRASE OR COMBINATION OF WORD(S)/PHRASE(S) | TYPE | SIZE | PART OF SPEECH | LIST OF IDS OF CORRESPONDING SYNONYMS OR EXPRESSIONS |
|---|---|---|---|---|---|
| W000001 | original idea | dbcs | 8 | noun | W000002, W000004, ······. |
| W000002 | original idea | sbcs | 4 | noun | W000001, W000004, ······. |
| W000003 | their | dbcs | 2 | noun | W000007, W000008, W000009, W000010, W000012, W000013, ······. |
| W000004 | idea | dbcs | 4 | noun | W000001, W000002, ······. |
| W000005 | sample | dbcs | 8 | noun | W000006, W000011, ······. |
| W000006 | sample | sbcs | 4 | noun | W000005, W000011, ······. |
| W000007 | creators' | dbcs | 4 | noun | W000003, W000008, W000009, W000010, W000012, W000013, ······. |
| W000008 | designers' | dbcs | 4 | noun | W000003, W000007, W000009, W000010, W000012, W000013, ······. |
| W000009 | inventors' | dbcs | 8 | noun | W000003, W000007, W000008, W000010, W000012, W000013, ······. |
| W000010 | devisers' | dbcs | 4 | noun | W000003, W000007, W000008, W000009, W000012, W000013, ······. |
| W000011 | examples | dbcs | 2 | noun | W000005, W000006, ······. |
| W000012 | planners' | dbcs | 6 | noun | W000003, W000007, W000008, W000009, W000010, W000013, ······. |
| W000013 | makers' | dbcs | 2 | noun | W000003, W000007, W000008, W000009, W000010, W000012, ······. |
| W000014 | clear | dbcs | 6 | adjective | ······. |
| W000015 | understandable | dbcs | 6 | verb | ······. |
| W000016 | processes | dbcs | 4 | noun | ······. |
| W000017 | implementation | dbcs | 4 | noun | W000018, C001001, ······. |
| W000018 | feasibility | dbcs | 6 | noun | W000017, C001001, C001002, ······. |
| ······ | ······ | ······ | ······ | ······ | ······. |
| C001001 | possibility of implementation | dbcs | 14 | combination | W000017, W000018, C001002, ······. |
| C001002 | bringing about the realization of | dbcs | 14 | combination | W000018, C001001, ······. |
| C001003 | giving the appearance of reality | dbcs | 20 | combination | C001002, ······. |
| ······ | ······ | ······ | ······ | ······ | ······. |
| E002001 | feasibility | sbcs | 11 | noun | E102001, ······. |
| E002002 | realization | sbcs | 11 | noun | E102002, ······. |
| ······ | ······ | ······ | ······ | ······ | ······. |
| E102001 | possible to achieve | sbcs | 19 | noun | E002001, ······. |
| E102002 | the fact that it appears | sbcs | 24 | noun | E002002, ······. |
| ······ | ······ | ······ | ······ | ······ | ······. |
| E202001 | making real | sbcs | 11 | combination | E202002, ······. |
| E202002 | giving the appearance of reality | sbcs | 32 | combination | E202001, ······. |
| ······ | ······ | ······ | ······ | ······ | ······. |

FIGURE 5B

| ID | EFFECT | FROM | TO |
|---|---|---|---|
| L000001 | decrease | adj. + noun + verb + noun | noun + adj. + noun |
| L000002 | decrease | adj. + noun + particle + adj. | noun + particle + adj. |
| ...... | ...... | ...... | ...... |
| L100001 | increase | noun + adj. + noun | adj. + noun + verb + noun |
| L100002 | increase | noun + particle + adj. | adj. + noun + particle + adj. |
| ...... | ...... | ...... | ...... |
| L200001 | decrease | noun1 + noun2 + verb + adj | adj + noun + noun |
| L200002 | decrease | noun1 + verb + prep + adj + noun2 | adj + noun2 + noun1 |
| ...... | ...... | ...... | ...... |
| L300001 | increase | adj + noun + noun | noun1 + noun2 + verb + adj |
| L300002 | increase | adj + noun2 + noun1 | noun1 + verb + prep + adj + noun2 |
| ...... | ...... | ...... | ...... |

502

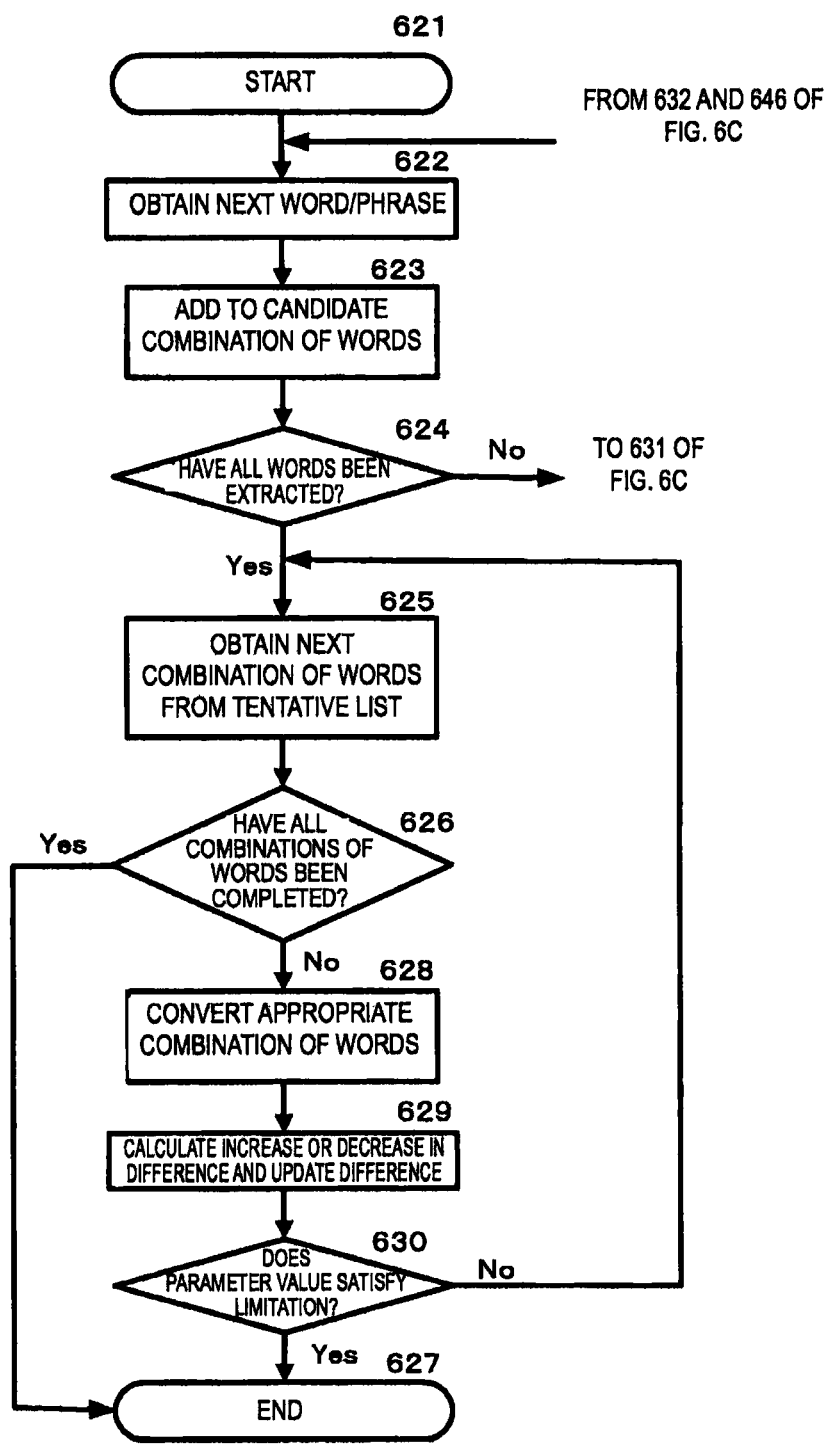

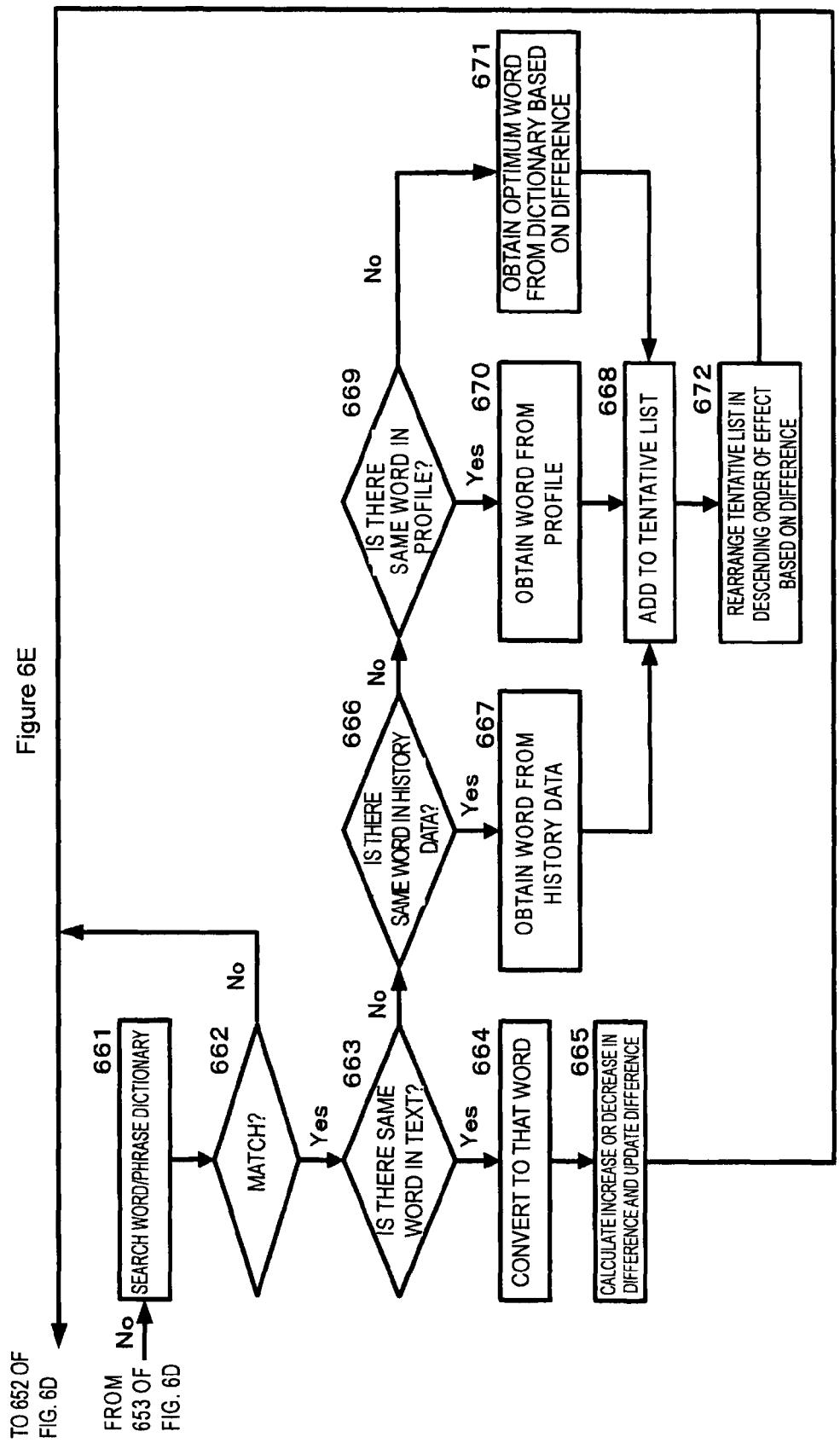

RANGE-BASED TEXT EDITING

CROSS-REFERENCE TO RELATED APPLICATION

This application claims the benefit of priority under 35 U.S.C §119 to Japanese Patent Application No. 2011-251850, filed on Nov. 17, 2011, which is herein incorporated by reference in its entirety.

BACKGROUND

The present invention generally relates to text editing, and more particularly to automatically editing text having a certain limitation, for example, an upper or lower limit on the number of characters, lines, or pages.

There are many occasions where natural-language texts that have certain specified limitations such as an upper or lower limit of the number of characters, the number of lines, or the number of pages, for example research papers, articles, abstracts of patent specifications, columns, electronic mails, electronic messages or telegraphic messages, are input and edited on information processing apparatuses. For example, a message (tweet) in Twitter™ posted by a user is limited to up to 140 characters. Short Message Service (SMS) or Multi Messaging Service (MMS) for mobile phones or smartphones allows exchange of messages up to several tens of characters and several hundreds of Kbytes, respectively, although the number varies depending on carriers.

BRIEF SUMMARY

Embodiments include a method, system, and computer program product for text editing. An aspect includes, in response to an instruction to apply editing to at least one sentence within a document that is displayed on a display screen, changing a first word or phrase in the at least one sentence for a second word or phrase while maintaining semantic content of the first word or phrase and such that the at least one sentence falls within a predetermined range, wherein the changing the first word or phrase comprises one of: in response to the second word or phrase having more characters or words than the first word or phrase, changing a third word or phrase within the at least one sentence including the second word or phrase for a fourth word or phrase, such that the at least one sentence including the second word or phrase falls within the predetermined range; and in response the second word or phrase having fewer characters or words than the first word or phrase, changing a fifth word or phrase within the at least one sentence including the second word or phrase for a sixth word or phrase, such that the at least one sentence including the second word or phrase falls within the predetermined range. Another aspect includes displaying the at least one sentence including the second word or phrase, and one of the fourth word or phrase and the sixth word or phrase, on the display screen.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

FIG. 3A illustrates an exemplary document (in Japanese) being edited and an example in which a portion of the document (in Japanese) under edit to which editing is to be applied is selected;

FIG. 3B illustrates examples of settings of a predetermined range in editing illustrated in FIG. 3A, according to an embodiment;

FIG. 3C illustrates results of automatic editing performed so that the text illustrated in FIG. 3A to which the editing is applied falls within the predetermined ranges illustrated in FIG. 3B;

FIG. 3E illustrates an example in which a word or a phrase or a combination of words, phrases, or a word(s) and a phrase(s) in a result of editing is adjusted in the case where the number of lines is increased as illustrated in FIG. 3C;

FIG. 4A illustrates an exemplary document (in English) being edited and an example in which a portion of the document (in English) under edit to which editing is to be applied is selected;

FIG. 4B illustrates examples of settings of a predetermined range in editing illustrated in FIG. 4A, according to an embodiment;

FIG. 4C illustrates results of automatic editing performed so that the text illustrated in FIG. 4A to which the editing is applied falls within the predetermined ranges illustrated in FIG. 4B;

FIG. 4D illustrates an example in which a word or a phrase or a combination of words, phrases, or a word(s) and a phrase(s) in a result of editing is adjusted in the case where the number of lines is decreased as illustrated in FIG. 4C;

FIG. 4E illustrates an example in which a word or a phrase or a combination of words, phrases, or a word(s) and a phrase(s) in a result of editing is adjusted in the case where the number of lines is increased as illustrated in FIG. 4C;

FIG. 5A illustrates an example of a word/phrase dictionary that can be used in an embodiment for replacing a word or phrase or a combination of words, phrases, or a word(s) and a phrase(s) with another word or phrase or another combination of words, phrases or a word(s) and a phrase(s);

FIG. 5B illustrates an example of a rearranging dictionary that can be used in an embodiment for rearranging a plurality of words or phrases in another order of words or phrases;

FIG. 6B is a flowchart illustrating in detail a rearrangement process among the blocks of the basic flowchart illustrated in FIG. 6A;

FIG. 6E is a flowchart illustrating in detail the replacement process among the blocks of the basic flowchart illustrated in FIG. 6A.

DETAILED DESCRIPTION

Figure 1:
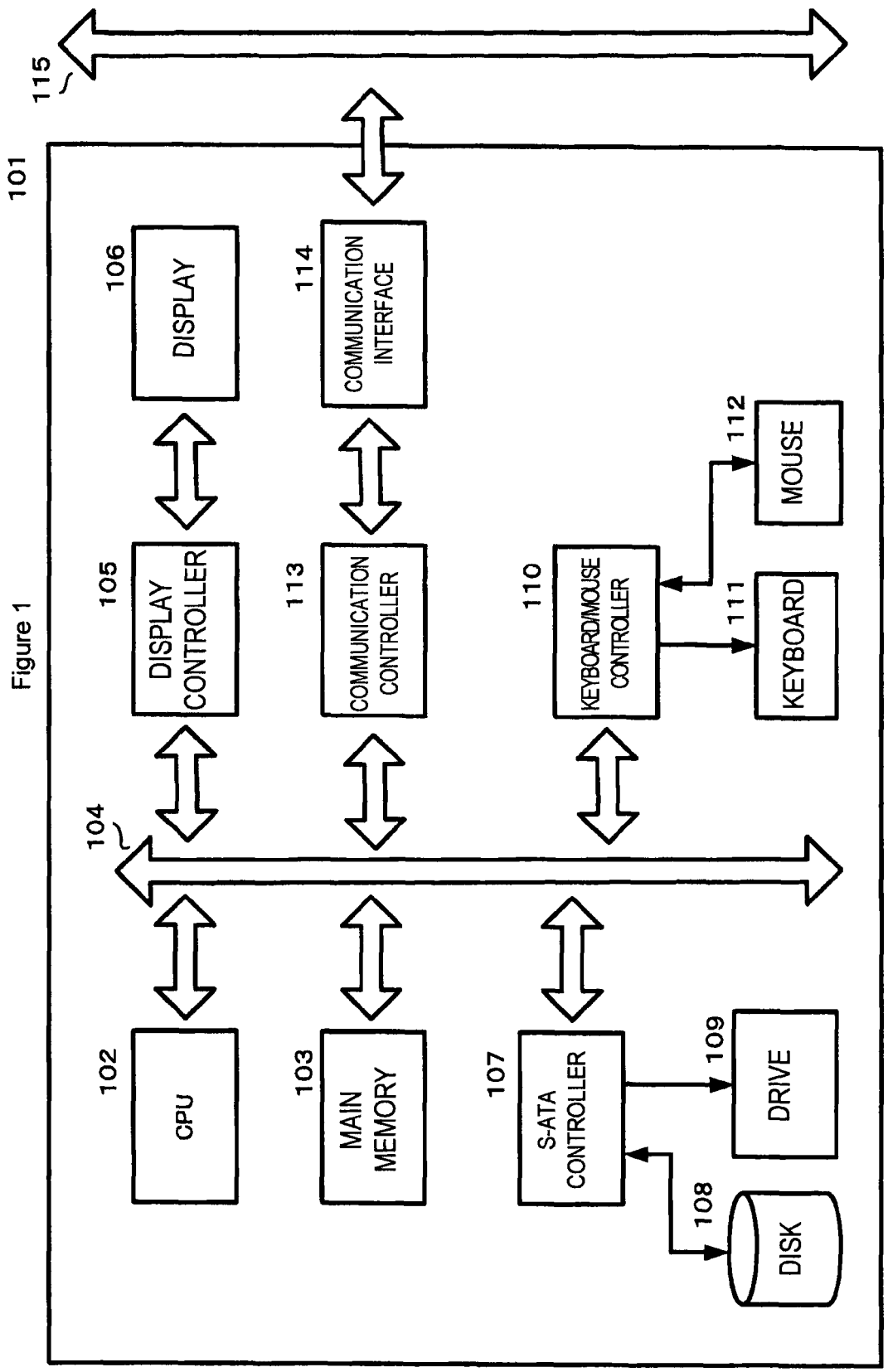
FIG. 1 is a diagram illustrating an exemplary hardware configuration of an information processing apparatus for implementing an apparatus (for example a computer) according to an embodiment.

Embodiments described herein are directed to range-based text editing. When a user writes text in accordance with a specified limitation on the number of characters, lines, or pages, the user needs to perform manual editing tasks such as specifying and deleting a particular portion (for example a word(s) or phrase(s)) of one or more sentences under edit, or replacing a particular portion with another word(s) or phrase(s) or adding a particular word(s) or phrases(s) while maintaining the semantic content of the portion. Such manual editing tasks make user's text editing troublesome. Composition or editing of text that has a range limitation on the number of characters, lines, or pages requires edits to increase or decrease characters, lines, or pages by changing or rearranging words or phrases so as to meet the range limitation. Such an editing task while maintaining the semantic content of the text, however, is burdensome and also time-consuming and thus inefficient for text composition. Embodiments may therefore facilitate or improve the efficiency of composition or editing of text that has a range limitation, providing a technique that enables composition or editing of text having that meets the range limitation while also having consistency of semantic expressions.

Embodiments change at least one of a word or a phrase and a combination of words, phrases, or a word(s) and a phrase(s) (hereinafter also referred to as a first word or phrase) in at least one sentence to another word or phrase, or another combination of words, phrases, or a word(s) and a phrase(s) (hereinafter also referred to as a second word or phrase) so that the at least one sentence falls within a predetermined range while maintaining the semantic content of the word or phrase. Here, "at least one of a word or a phrase and a combination of words, phrases, or a word(s) and a phrase(s)" means any of only one word or phrase, only one combination of words, phrases, or a word(s) and a phrase(s), two or more words or phrases, two or more combinations of words, phrases, or a word(s) and a phrase(s), at least one word or phrase, and at least one combination of words, phrases, or a word(s) and a phrase(s). A reference to "a word or phrase or a combination of words, phrases, a word(s) and a phrase(s)" in the following description means "one word or phrase or one combination of words, phrases, or a word(s) and a phrase(s)".

The change may be made according to (1), (2) or a combination of (1) and (2) described below, in various embodiments:

(1) When at least one first word or phrase is changed to a second word or phrase having more characters than the first word or phrase: at least one of a word or phrase or a combination of words, phrases, or a word(s) and phrase(s) other than the second word or phrase (hereinafter also referred to as a third word or phrase) in the at least one sentence including the second word or phrase is changed to another word or phrase or another combination of words, phrases or a word(s) and a phrase(s) that has fewer characters than the third word or phrase (hereinafter also referred to as a fourth word or phrase), so that the at least one sentence including the second word or phrase falls within the predetermined range; and (2) When at least one first word or phrase is changed to a second word or phrase having fewer characters than the first word or phrase: at least one of a word or phrase or a combination of words, phrases, or a word(s) and phrase(s) other than the second word or phrase (hereinafter also referred to as a fifth word or phrase) in the at least one sentence including the second word or phrase is changed to another word or phrase or another combination of words, phrases or a word(s) and a phrase(s) that has more characters than the fifth word or phrase (hereinafter also referred to as a sixth word or phrase), so that the at least one sentence including the second word or phrase falls within the predetermined range.

Embodiments provide a machine-implemented method for editing text. The method includes: in response to an instruction to apply editing to at least one sentence which is an object of editing within a document that is displayable on a display screen, changing at least one of a first word and phrase in the at least one sentence to a second word or phrase while maintaining semantic content of the word or phrase such that the at least one sentence falls within a predetermined range; and displaying the at least one sentence including the second word or phrase on the display screen. The change is performed according to (1), (2) or a combination of (1) and (2) given above.

In one embodiment, displaying at least one sentence including the second word or phrase on the display screen may include visualizing the second word or phrase, or the fourth word or phrase, or the sixth word or phrase. In one embodiment, the method may further include: in response to at least one of the second word or phrase, the fourth word or phrase and the sixth word or phrase being selected by a user, displaying near the selected word or phrase (the second word or phrase, the fourth word or phrase, or the sixth word or phrase) on the display screen a conversion list indicating at least one conversion candidate which is another word or phrase, or another combination of words, phrases or a word(s) and a phrase(s) to which the selected word or phrase can be converted while maintaining the semantic content of the selected word or phrase; and in response to one of the conversion candidate(s) on the conversion list being selected by the user, replacing the selected word or phrase with the conversion candidate selected by the user.

In one embodiment, the replacing may further include: in response to one of the conversion candidate on the conversion list being selected by the user, if the selected conversion candidate has more characters or words than the selected word or phrase, a first indicating block of indicating that at least one of one word or phrase and one combination of phrases, words or a word(s) or a phrase(s) in the at least one sentence including the selected conversion candidate other than the selected conversion candidate (hereinafter referred to as a seventh word or phrase), or at least one of one word or phrase and one combination of words, phrases or a word(s) and a phrase(s) other than the selected conversion candidate in at least one sentence which is the object of editing other than the at least one sentence including the selected conversion candidate (hereinafter referred to as an eighth word or phrase) can be changed to another one word or phrase or another combination of words, phrases or a word(s) and a phrase(s) that has fewer characters or words than the selected conversion candidate (hereinafter referred to as a ninth word or phrase) such that the at least one sentence including the selected conversion candidate falls within the predetermined range; or if the selected conversion candidate has fewer characters or words than the selected word or phrase, a second indicating block of indicating that at least one of the one word or phrase and one combination of words, phrases or a word(s) and a phrase(s) in the at least one sentence including the selected conversion candidate other than the selected conversion candidate (hereinafter referred to as a tenth word or phrase), or at least one word or phrase or one combination of words, phrases or a word(s) and a phrase(s) other than the selected conversion candidate in at least one sentence which is the object of editing other than the at least one sentence (hereinafter referred to as an eleventh word or phrase) can be changed to another word or phrase or another combination of words and phrases or a word(s) and a phrase(s) having more characters or words than the selected conversion candidate (hereinafter referred to as a twelfth word or phrase) such that the at least one sentence including the selected conversion candidate falls within the predetermined range.

In one embodiment, the replacing may further include: a third changing block of changing the seventh word or phrase or the eighth word or phrase to the ninth word or phrase in response to one of the conversion candidate(s) on the conversion list being selected by the user; or a fourth changing block of changing the tenth word or phrase or the eleventh word or phrase to the twelfth word or phrase in response to one of the conversion candidate(s) on the conversion list being selected by the user.

Second, embodiments provide an apparatus editing text. The apparatus includes: a change unit which, in response to an instruction to apply editing to at least one sentence which is an object of editing within a document that is displayable on a display screen, changes at least one of a first word and phrase in the at least one sentence to a second word or phrase while maintaining semantic content of the word or phrase such that the at least one sentence falls within a predetermined range; and a display unit displaying the at least one sentence including the second word or phrase on the display screen. The change unit performs (1), (2) or a combination of (1) and (2) given above.

In one embodiment, the display unit may further include a visualizing unit visualizing the second word or phrase or the fourth word or phrase or the sixth word or phrase. In one embodiment, the apparatus may further include: a replacement unit which, in response to at least one of the second word or phrase, the fourth word or phrase and the sixth word or phrase being selected by a user, displays near the selected word or phrase (the second word or phrase, the fourth word or phrase, or the sixth word or phrase) on the display screen a conversion list indicating at least one conversion candidate which is another word or phrase, or another combination of words, phrases or a word(s) and a phrase(s) to which the selected word or phrase can be converted while maintaining the semantic content of the selected word or phrase; and in response to one of the conversion candidate(s) on the conversion list being selected by the user, replaces the selected word or phrase with the conversion candidate selected by the user.

In one embodiment, in response to one of the conversion candidate on the conversion list being selected by the user, if the selected conversion candidate has more characters or words than the selected word or phrase, the replacement unit may indicate that at least one of one word or phrase and one combination of phrases, words or a word(s) or a phrase(s) in the at least one sentence including the selected conversion candidate other than the selected conversion candidate (a seventh word or phrase), or at least one of one word or phrase and one combination of words, phrases or a word(s) and a phrase(s) other than the selected conversion candidate in at least one sentence which is the object of editing other than the at least one sentence including the selected conversion candidate (an eighth word or phrase) can be changed to another one word or phrase or another combination of words, phrases or a word(s) and a phrase(s) that has fewer characters or words than the selected conversion candidate (a ninth word or phrase) such that the at least one sentence including the selected conversion candidate falls within the predetermined range; or if the selected conversion candidate has fewer characters or words than the selected word or phrase, the replacement unit may indicate that at least one of the one word or phrase and one combination of words, phrases or a word(s) and a phrase(s) in the at least one sentence including the selected conversion candidate other than the selected conversion candidate (a tenth word or phrase), or at least one word or phrase or one combination of words, phrases or a word(s) and a phrase(s) other than the selected conversion candidate in at least one sentence which is the object of editing other than the at least one sentence (an eleventh word or phrase) can be changed to another word or phrase or another combination of words and phrases or a word(s) and a phrase(s) having more characters or words than the selected conversion candidate (a twelfth word or phrase) such that the at least one sentence including the selected conversion candidate falls within the predetermined range. In one embodiment, in response to one of the conversion candidate(s) on the conversion list being selected by the user, the replacement unit may change the seventh word or phrase or the eighth word or phrase to the ninth word or phrase; or the replacement unit may change the tenth word or phrase or the eleventh word or phrase to the twelfth word or phrase.

Third, some embodiments provide a computer program for editing text. The computer program causes an apparatus to perform the blocks of the method described above. In addition to the program itself, a recording medium including the program recorded thereon falls within the scope of various embodiments. The program for executing functions can be stored on any computer-readable storage medium such as a flexible disk, a compact disc read only memory (CD-ROM), a digital video disc (DVD), a hard disk unit, a universal serial bus (USB) memory, a read only memory (ROM), an magnetoresistive random access memory (MRAM), and a random access memory (RAM). The program can be downloaded from another data processing system connected through a communication link or copied from another recording medium in order to store on such a recording medium. The program may be compressed or divided into a plurality of parts and stored on a single or a plurality of recording media. It should be noted that a program products that implements an embodiment may be provided.

Embodiments may include a computer program, a computer program product, software, and a software product as well. The computer program product or software product may include the computer program described above, a storage medium storing the software, or a transmission medium that transmits the computer program or the software. Various modifications such as combining hardware components of a computer used in an embodiment with a plurality of machines and distributing and implementing functions among them. Those modifications are encompassed various embodiments. However, those components are illustrative and not all of the components are essential.

Embodiments may be implemented in hardware, software or a combination of hardware and software. An example of execution by a combination of hardware and software may be execution by a data processing system including a given program. In that case, the given program is loaded into and executed by the data processing system, thereby controlling the data processing system to cause the data processing system to execute processes according to various embodiments. The program includes a set of instructions that can be expressed in any language, code and/or notation. Such a set of instructions enables the system to execute a particular function directly, or after the system has translated the set of instructions into another language, code and/or notation, and/ or after the system has copied the set of instructions to another medium.

In addition to the program itself, a recording medium including the program recorded thereon falls within the scope of various embodiments. The program may be stored on any appropriate computer-readable medium such as a flexible disk, a CD-ROM, a DVD, blu-ray disc (BD), a hard disk unit, a ROM, an MRAM, and a RAM. The program can be downloaded from another data processing system connected through a communication link or copied from another recording medium in order to store on such a recording medium. The program may be compressed or divided into a plurality of parts and stored on a single or a plurality of recording media. It should be noted that a program products that implement the various embodiments may be provided.

Various embodiments change a word or phrase or a combination of words, phrases, or a word(s) and a phrase(s) to another word or phrase or another combination of words, phrases or a word(s) and a phrase(s) (that is, a kind of replacement) while maintaining its semantic content in order to meet the limitation mentioned above. Embodiments enable coexistence of a change that lengthens a word or phrase or a combination of words, phrase or a word(s) and a phrase(s) and a change that shortens a word or phrase or a combination of words, phrases or a word(s) and a phrase(s). Since the conversion enables coexistence of lengthened and shortened words or phrases, the conversion can optimize a sentence to a more natural and smoother sentence according to a situation (for example a situation where the number of characters in the sentence needs to be decreased or a situation where the number of characters in the sentence needs to be increased) than a sentence resulting from conversion to only longer words or phrases or conversion to only shorter words or phrases.

Embodiments also enable readjustment of a converted word or phrase or a converted combination of words, phrases or a word(s) and a phrase(s). Furthermore, Embodiments visualize the converted word or phrase or the converted combination of words, phrases or a word(s) and a phrase(s) during the readjustment to allow a user to readily select a candidate to readjust. When a sentence no longer satisfies the limitation, the readjustment enables a word or phrase or a combination of words, phrases or a word(s) and a phrase(s) to be changed to another word or phrase or another combination of words, phrases or a word(s) and a phrase(s) while maintaining the semantic content of the sentence, or enables conversion candidates for change to be automatically displayed.

FIG. 1 is a diagram illustrating an exemplary hardware configuration of an information processing apparatus for implementing an apparatus, for example a computer, according to an embodiment. The apparatus (101) includes a central processing unit (CPU) and a main memory (103), which are connected to a bus (104). The CPU (102) may be any appropriate processor, and may be based on a 32-bit or 64-bit architecture in some embodiments. A display (106), for example liquid-crystal display (LCD), may be connected to the bus (104) through a display controller (105). The display (106) is used for displaying, through an appropriate graphic interface, information about a computer connected to a network through a communication link for management of the computer and information about software running on the computer. Also, a storage device comprising a disk (108), for example a silicon disk or a hard disk, and a storage device comprising a drive (109), for example a CD, DVD, or BD drive may be connected to the bus (104) through a serial advanced technology attachment (SATA) or integrated drive electronics (IDE) controller (107). Furthermore, a keyboard (111) and a mouse (112) can be connected to the bus (104) through a keyboard/mouse controller (110) or a USB bus (not depicted).

An operating system, programs that provide a Java™ processing environment such as J2EE, a Java™ application, a Java™ virtual machine (VM), a Java™ Just-In-Time (JIT) compiler, and other programs and data are stored on the disk (108) in such a manner that the programs can be loaded into a main memory. A frontend processor (FEP), which is software that enables input or editing of text and character conversion software, is also stored on the disk (108) in such a manner that it can be loaded into the main memory. The operating system may be any appropriate operating system. The drive (109) is used for installing a program from a CD-ROM, a DVD-ROM or a BD to the disk (108) as needed.

A communication interface (114) conforms to Ethernet™ protocols, for example. The communication interface (114) is connected to the bus (104) through a communication controller (113), is responsible for physically connecting the apparatus (101) to a communication link (115), and provides a network interface layer to a transmission control protocol/ internet protocol (TCP/IP) communication protocol for a communication facility of the operating system of the apparatus (101). The communication link may be a wired local area network (LAN) environment or a wireless LAN environment based on a wireless LAN connection standard such as IEEE 802.11a/b/g/n.

It will be readily understood from the foregoing description that a computer according to an embodiment is implemented by an information processing apparatus such as a conventional personal computer, workstation, or mainframe computer, or a system including a combination of these computers. An apparatus according to an embodiment may be an apparatus other than a computer, on which text can be input, such as a smartphone, a mobile phone, a tablet terminal, a gaming terminal, or an internet television set. It will be understood from the foregoing that an apparatus used in an embodiment is not limited to a particular operating system environment.

Figure 2:
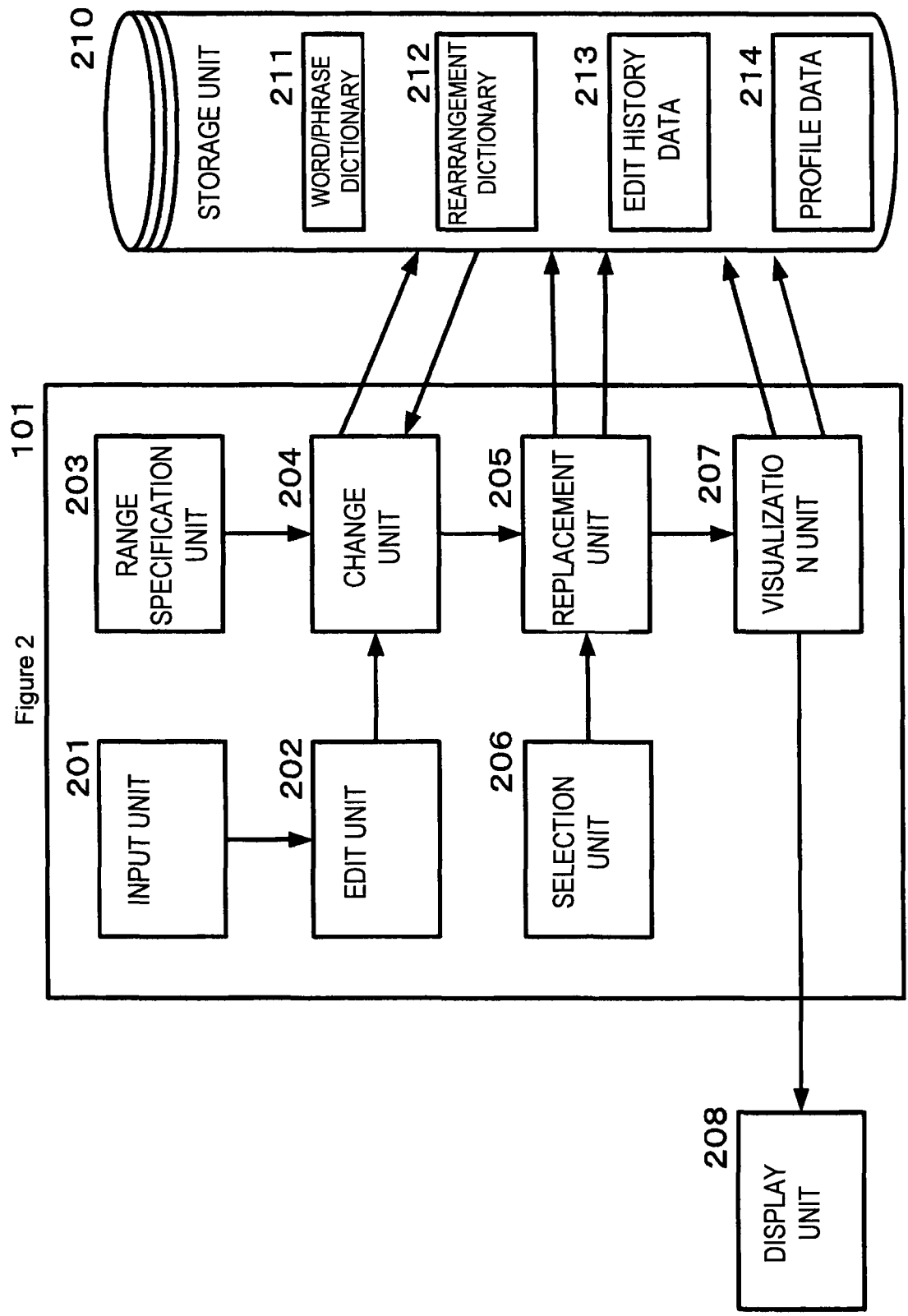
FIG. 2 is a functional block diagram of an apparatus having the hardware configuration in FIG. 1 according to an embodiment.

FIG. 2 is a functional block diagram of an apparatus according to an embodiment. The apparatus may be of any type that includes a text input facility. Input languages are not limited to particular languages and may be single-byte languages such as English, French and German, or double-byte languages such as Japanese and Chinese. The apparatus may be a computer, a handheld apparatus, or a gaming machine. The computer may be a personal computer or a server computer, for example, and may be a computer of any type that includes a text input facility. The handheld apparatus may be a smartphone, a mobile phone, a PDA or a tablet apparatus and may be an apparatus of any type that includes a text input facility. The gaming machine may be a portable gaming machine, for example a gaming machine designed to be connected to a video apparatus, for example a television set, and may be an apparatus of any type that includes a text input facility.

The apparatus has a hardware configuration according to FIG. 1. However, the apparatus may be one that does not have a keyboard or mouse, such as a smartphone, a mobile phone, and a tablet apparatus. In that case, text can be input through a software keyboard displayed on a screen or by speech input through a microphone. The apparatus (101) may include an input unit (201), an edit unit (202), a range specification unit (203), a change unit (204), a replacement unit (205), a selection unit (206) and a visualization unit (207). The apparatus (101) itself may include a display unit (208) or the apparatus (101) may be connected to a display unit (208) through a wired or wireless connection. The apparatus (101) may include an internal storage unit (210), or may be connected to a storage unit (210) through a cable or through a wired or wireless intranetwork or internetwork. The input unit (201) receives a text input from a user. The input unit (201) typically includes a keyboard. The keyboard may be a hardware keyboard or a keyboard implemented by software and displayed on the display unit (208) (the so-called software keyboard). Alternatively, the input unit (201) may be implemented by a speech recognition device or a speech recognition application (for example Via Voice™ using a speech input. Text can be input through any software that accepts a text input. The software may be software that enables input or edit of text, for example a word processor or a text editor, or a word processor or a text editor that is implemented on a Web browser, or a front-end processor (FEP) which is character conversion software. Input text may include, but not limited to, text for preparing a document, for example a research paper, an article, or the abstract of a patent specification, a column, an electronic mail, an electronic message or a telegraphic message. The edit unit (202) enables editing of text input through the input unit (201). The edit unit (202) enables a user to add (insert), delete, or rearrange words and phrases. The edit unit (202) may be one included in or attached to the above-mentioned software (for example a word processor) that accepts a text input as a standard facility.

The range specification unit (203) enables a user to select a text to edit upon reception of an instruction to apply editing. The text to be edited may be an entire document or a part of a document. Part of a document may be at least one line, at least one paragraph, or at least one page, for example. The range specification unit (203) is capable of identifying a limitation on text to be edited through selection or specification of a particular region in a part selected as text to be edited. The limitation on text to be edited is a parameter value that causes at least one sentence under edit to fall within a predetermined range (for example the number of characters, the number of lines, the number of phrases, the number of pages, or a display range). The selection or specification in the range specification unit (203) may be implemented by enabling selection with a mouse or specification with a cursor, for example.

The "instruction to apply editing" may be issued in response to any one or any combination of the events (1)-(8), described below:

(1) that the size, position, or the combination of the size and position of a display range selected by the user as a portion to be edited in at least one sentence displayed on a display screen has been changed, where the change of the size of the display range may include a change of the number of characters, the number of words, the number of lines, the number of paragraphs, the number of pages, the number of columns, a setting of a document sheet, a portrait/landscape print orientation, the direction of a character string, the number of characters or words per line, or a margin of a page, double/single-byte character input, or a combination of these, and the change of the position of a display range may include movement of the display range;

(2) that the number of input characters (including characters in process of being edited), the number of words, the number of lines, the number of paragraphs, the number of pages or the number of columns in an entire or part of a document that is being edited or has been read out from the storage device (108, 109) has exceeded a predetermined upper limit, where the upper limit is exceeded when entry of a character input in excess of the upper limit is confirmed, for example, and the excess can be determined from depression of an enter key in the case of the Japanese language or from entry of a space in the case of the English language;

(3) that input of at least one text in an entire or part of a document that is being edited or has been read from the storage device (108, 109) has been completed, for example that input of one sentence has been completed;

(4) that a sentence or a part of sentence, for example a word or phrase or a combination of words, phrases or a word(s) and a phrase(s) has been pasted to any location or a predetermined location in an entire or part of document that is being edited or has been read out from the storage device (108, 109);

(5) that if a predetermined range is a display range, the size or position of the display range or a combination of the size and position has been changed, where the change of the combination includes change of the number of lines and the display range;

(6) that if a predetermined range is a display range, the display range has been moved to a region adjacent to a graphic object embedded in a document under edit or read out from the storage device (108, 109); or (7) that an instruction to apply editing has been input by a user, where the instruction can be recognized from depression of an optimization button for applying editing, for example; and (8) that if at least one message that is being edited or has been read out from the storage device (108, 109) is an electronic mail or message, an instruction to send an electronic mail or an instruction to post an electronic message has been input.

The "predetermined range" may be any one of or any combination of the following ranges (1)-(11):

(1) specification of a minimum number of characters, specification of a maximum number of characters, or specification of minimum and maximum numbers of characters;

(2) specification of a minimum number of words, specification of maximum number of words, or specification of minimum and maximum numbers of words;

(3) specification of a minimum number of lines, specification of a maximum number of lines, or specification of minimum and maximum numbers of lines;

(4) specification of a minimum number of paragraphs, specification of maximum number of paragraphs, or specification of minimum and maximum numbers of paragraphs;

(5) specification of a minimum number of pages, specification of maximum number of pages, or specification of minimum and maximum numbers of pages;

(6) specification of a minimum number of columns or specification of a maximum number of columns;

(7) specification of a minimum number of characters per line, specification of a maximum number of characters per line, and minimum and maximum numbers of characters per line;

(8) specification of a minimum number of words per line, specification of a maximum number of words per line, and minimum and maximum numbers of words per line;

(9) specification of at least one of a margin of a page, the size of a document sheet, a font, a font size, a character spacing, and a line spacing;

(10) specification of a fixed number of characters and a minimum number of lines, specification of a fixed number of characters and a maximum number of lines, or a specification of a fixed number of characters and minimum and maximum numbers of lines; and

(11) a particular display range capable of displaying text specified by a user, where the particular display range may be a region adjacent to a graphic-object display region (which may be a region to the left or right of a graphic-object display region or a region between two graphic-object display regions) included in the document.

Examples of the predetermined range include those listed below in examples (1)-(4); these examples are illustrative and the predetermined range is not limited to the examples (1)-(4) below:

(1) Twitter™: A message (tweet) is limited up to 140 characters.

(2) Abstract of a research paper: For example, an upper limit of 200 characters and a lower limit of 180 characters may be specified.

(3) Abstract of a patent specification: There is an upper limit of 400 characters in the abstract of a patent specification in Japan.

(4) Research paper of Information Processing Society of Japan: The following margins and numbers of characters and lines are specified: pages should have a top margin of 27 mm, a bottom margin of 27 mm, a left margin of 20 mm and a right margin of 20 mm, and each of the two columns should be formatted to 38 characters by 36 lines.

The phrase "causes at least one sentence under edit to fall within a predetermined range" given above means, if the predetermined range is the number of characters, for example, that the number of characters in the sentence is limited up to the predetermined number of characters, e.g., the number of characters is made closest to the predetermined number of characters and falls within the range of the predetermined number of characters, or, if the predetermined range is the number of lines, that the number of characters is increased or decreased so that the number of lines falls within the predetermined range, so that the number of the lines becomes equal to the predetermined number of lines, or if the predetermined range is the number of pages, that the number of characters is increased or decreased so that the number of pages falls within the predetermined range of the number of pages, e.g., the number of characters is increased or decreased so that the number of pages falls within the predetermined range. These limitations are illustrative and the limitations not limited to these.

A process performed by the change unit (204) will be detailed later in the description of FIGS. 6A, the description of FIGS. 6B to 6C, and the description of FIGS. 6D to 6E. A process performed by the replacement unit (205) will be detailed later in the description of FIG. 7.

The selection unit (206) allows a user to select a converted word or phrase or a converted combination of words, phrases or a word(s) and a phrase(s) in text under edit that has been automatically edited (optimized) so as to fall within the predetermined range, with the intent of reconverting the converted word or phrase or the converted combination of words, phrases or a word(s) and a phrase(s). The selection in the selection unit (206) can be implemented by enabling selection with a mouse or a cursor, for example. Upon entering an adjustment mode described later and illustrated in FIG. 7, the visualization unit (207) visualizes a word or phrase or a combination of words, phrases or a word(s) and a phrase(s) changed by a process described later and illustrated in FIGS. 6A to 6E. The display unit (208) is a device that displays text under edit and may be a liquid-crystal display, a touch-panel display, or a projector. The storage unit (210) can store a word/phrase dictionary (211), a rearrangement dictionary (212), user edit history data (213), and user profile data (214).

The word/phrase dictionary (211) is a dictionary that can be used in an embodiment and contains words and phrases that can be used for replacing a word or phrase or a combination of words, phrases or a word(s) and a phrase(s) with another word or phrase or another combination of words, phrases or a word(s) and a phrase(s). The word/phrase dictionary (211) can include data described below and illustrated in FIG. 5A, for example. The word/phrase dictionary (211) can be implemented for example as an extension dictionary of a front end processor, for example a word input system. Here, the term "word or phrase" can mean a word or a phrase, and the term "a combination of words, phrases or a word(s) and a phrase(s)" can mean one expression that makes sense. The definition of the term "word or phrase" can vary depending on languages and the definition of "word or phrase" in a language of interest can be applied. Furthermore, a "plurality of words or phrases" and a "combination of words, phrases or a word(s) and a phrase(s)" cannot exactly be distinguished from each other and may overlap one another. Here, the expression "replace a word or a phrase or a combination of words, phrases or a word(s) and a phrase(s) with another word or a phrase or a combination of words, phrases or a word(s) and a phrase(s)" encompasses replacement from a "word or phrase" to another "word or phrase", replacement from a "word or phrase" to a "combination of words, phrases or a word(s) and a phrase(s)", replacement from a "combination of words, phrases or a word(s) and a phrase(s)" to a "word or phrase", and replacement from a "combination of words, phrase or word(s) and a phrase(s)" to another "combination of words, phrases or a word(s) and a phrase(s)". Replacement from a "combination of words, phrases or a word(s) and a phrase(s)" to a "combination of words, phrases or a word(a) and a phrase(s)" can encompass rearrangement of words and/or phrases.

The rearrangement dictionary (212) is a dictionary that can be used for rearranging the order of words and/or phrases of a combination of words, phrases or a word(s) and a phrase(s). The rearrangement dictionary (212) may include data described below and illustrated in FIG. 5B, for example. That is, the rearrangement dictionary (212) may include a rearrangement list of parts of speech of a combination of words, phrases or a word(s) and a phrase(s). While the word/phrase dictionary (211) and the rearrangement dictionary (212) are depicted as being separate files in FIG. 2, the word/phrase dictionary (211) and the rearrangement dictionary (212) may be implemented as the same dictionary file.

The edit history data (213) is history data which can be created for each user or each department or each company and contains a history of conversion of a word or phrase or a combination of words, phrases or a word(s) and a phrase(s). The conversion history is a history of conversions performed by a user on a word or phrase or a combination of words, phrases or a word(s) and a phrase(s) in editing of current text under edit or text that was edited by the user in the past and is different from the current text under edit. If multiple conversions were performed on the same word or phrase or the same combination of words, phrases or a word(s) and a phrase(s), the latest conversion may be listed as a conversion candidate in priority to other conversion candidate(s). The profile data (214) is data that can be created for each user or each department or each company and represents a preferred conversion mode. The profile data (214) is data that defines user's preferences in conversion of words and phrases and can define a style of writing (colloquial/literary style), the lengths of sentences, and a dictionary to use, for example.

FIG. 3A illustrates an exemplary document (in Japanese) being edited (item A) and an example of text (in Japanese) being edited in which a portion where editing is to be applied is selected (item B) according to an embodiment. Item A in FIG. 3A illustrates an example of text (301) being edited. It is assumed here that the number of (double-byte) characters per line is limited up to 38 in preparation of the document. It is assumed here that the document being edited in item A is a part of a document being edited and that three lines of text have been input in that part. Item B in FIG. 3A illustrates an example of a process in which a user specifies or selects a range to which an editing is to be applied in the text (301) being edited (hereinafter also referred to as an object of editing) (302). The user can specify or select a text to be edited with a mouse, for example. In item B, a text (303) enclosed in a dashed box has been specified as text to be edited (302). Text specified or selected can be one or more sentences, text that can be specified on a paragraph by paragraph basis or on a page by page basis, or the entire document being edited. The appearance of text under edit is altered so that the text can be distinguished from the rest of the text for visual identification by the user. While the text under edit is enclosed in the dashed box in item B, this is illustrative only. For example, text under edit may be visualized in such a way that the text under edit appears in a different color from the rest of the text.

FIG. 3B illustrates exemplary settings of a predetermined range according to an embodiment in the editing of the document illustrated in FIG. 3A. The range can be set with a mouse or a cursor, for example. When the mouse is used, the range can be set by moving up and down the (dashed) frame around the region in which the range is to be set. The set range can be visualized in such a way that the user can readily identify the range. In the example in FIG. 3B, the predetermined range is a display range. It is assumed in the example that application does not change a font, a font size, the number of characters per line, and a line spacing. Item C (1) (311) illustrates that a predetermined display range (312) is two lines. That is, item C (1) (311) illustrates an example in which the document is edited so that the three lines of text (303) to be edited selected in item B (302) in FIG. 3A changes to two lines of text (optimization for decreasing the number of lines). While the text (303) to be edited in Item B (302) in FIG. 3A is one sentence, text to be edited may be one or more sentences, for example one paragraph, one page or one entire document.

Item C (2) (313) illustrates that a predetermine display range is four lines. That is, item C (2) (313) illustrates an example in which the text (303) to be edited selected in item B (302) in FIG. 3A is edited in such a way that the three lines of text (303) under edit changes to four lines of text (optimization for increasing the number of lines). Item C (2) (315) illustrates that a predetermined display range is not lines but a certain display range (display region) (316) specified by the user. That is, item C (2) (315) illustrates an example in which the text to be edited selected in item B (302) in FIG. 3A is edited in such a way that the text falls within the display range (316) (change of a display range). The number of lines of the text under edit displayed in the display range (316) is determined by the size of the display range because the font, the font size, the number of characters per line, and the line spacing are not changed as stated above. The number of lines in this example is four.

FIG. 3C illustrates the result of editing automatically performed so that the text to be edited selected in item B (302) in FIG. 3A falls within the predetermined range illustrated in FIG. 3B according to an embodiment. Item D (1) (321) illustrates the result of editing (optimization) automatically performed so that the text (303) to be edited illustrated in (302) of FIG. 3A falls within the predetermined range (two lines) (312) illustrated in item C (1) (311) in FIG. 3B. The edits made are illustrated in Table 1 given below. The editing (optimization) may change the text so that a minimum number of words/phrases or combinations of words, phrases or a word(s) and a phrase(s) (the number of expressions) in the text including the edited expression "clearly explain by tactically using" are changed. A total of eight expressions have been changed in the example given below.

TABLE 1

| Word/phrase or combination of word(s)/phrase(s) before edit | | Word/phrase or combination of word(s)/phrase(s) after edit | | Type of conversion |
|---|---|---|---|---|
| 1. Lengthened word/phrase | | | | |
| "explain by using" | Combination of word(s)/phrase(s) | "clearly explain by tactically using" | Combination of word(s)/phrase(s) | Replacement |
| 2. Shortened word/phrase | | | | |
| "generally speaking" | Word/phrase | "generally" | Word/phrase | Replacement |
| "their own" | Word/phrase | "their" | Word/phrase | Replacement |
| "original idea" | Word/phrase | "invention" | Word/phrase | Replacement |
| "practicability" | Word/phrase | "feasibility" | Word/phrase | Replacement |
| "persons who evaluate" | Combination of word(s)/phrase(s) | "evaluators" | Word/phrase | Replacement |
| "show clear processes" | Combination of word(s)/phrase(s) | "of clear processes" | Combination of word(s)/phrase(s) | Rearrangement |
| "specific samples" | Word/phrase | "examples" | Word/phrase | Replacement |
| "need to" | Combination of word(s)/phrase(s) | "must" | Combination of word(s)/phrase(s) | Replacement |

In the example in item D (1) (321), the three lines of text (303) under edit needs to be decreased to two lines so that the text falls within the display range (312) predetermined in item C (1) in FIG. 3B (two lines). Suppose, however, that the user has changed (converted) the original expression "利用して説明する" to "clearly explain by tactically using" during editing of this document. In that case, the change made has been recorded in the edit history data (213). Accordingly, the change unit (204) of the apparatus (101) refers to the edit history data (213) in the storage unit (210) to change the original expression "explain by using" to "clearly explain by tactically using". As a result of the change, the number of characters in the text under edit including the edited expression "clearly explain by tactically using" increases from the number of characters in the original text. The change unit (204) therefore refers to the word/phrase dictionary (211), the rearrangement dictionary (212), the edit history data (213) and/or the profile data (214) to change a word or phrase or a combination of words, phrases or a word(s) and a phrase(s) other than the edited expression "clearly explain by tactically using" to another word or phrase or another combination of words, phrases or a word(s) and a phrase(s) so that the text under edit including the edited expression "clearly explain by tactically using" falls within the display range (two lines) (312) determined in item C (1) (311) (see the section "Shortened word/phrase" given above). This further change can be made so that in total a minimum number of words/phrases or combinations of words, phrases or a word(s) and a phrase(s) (the number of expressions) in the text under edit including the edited expression "clearly explain by tactically using" are changed.

Item D (2) (323) illustrates the result of editing automatically performed so that the text (303) to be edited illustrated in (302) of FIG. 3A falls within the range (four lines) (314) illustrated in item C (2) (313) of FIG. 3B. The edits made are illustrated in Table 2 below. The editing (optimization) may change the text so that in total a minimum number of words/phrases and combinations of words, phrases or a word(s) and a phrase(s) (the number of expressions) in the text including the edited words "feasibility" and "examples" are changed. A total of six expressions have been changed in the example given below.

during the editing of this document. In that case, the change made has been recorded in the edit history data (213). Accordingly, the change unit (204) of the apparatus (101) refers to the edit history data (213) in the storage unit (210) to change the word "practicability" to "feasibility". Suppose that the user has changed "specific samples" to "examples" during editing of a document other than the current document in the past. Then, the change unit (204) of the apparatus (101) refers to the profile data (214) in the storage unit (210) to change the word "specific samples" to "examples". As a result of these two changes, the number of characters in the edited text including the words "feasibility" and "examples" decreases from the number of characters in the original text. The change unit (204) therefore refers to the word/phrase dictionary (211), the rearrangement dictionary (212), the edit history data (213) and/or the profile data (214) to further change a word or phrase or a combination of words, phrase and or a word(s) and a phrase(s) other than the edited words "feasibility" and "examples" to another word or phrase or another combination of words, phrases or a word(s) and a phrase(s) so that the text under edit including the edited words "feasibility" and "examples" fits in the display range (four lines) (314) predetermined in item C (2) (313) (see the section "Lengthened word/phrase" given above).

Item D (3) (325) illustrates the result of automatic editing (optimization) performed so that the text (303) (120 characters) to be edited in (302) of FIG. 3A falls within the predetermined display range illustrated in item C (3) (315) in FIG. 3B (18 characters per line by 4 lines=72 characters). The edits made are illustrated in Table 3 given below. The additional change may change the text so that in total a minimum num-

TABLE 2

| Word/phrase or combination of word(s)/phrase(s) before edit | | Word/phrase or combination of word(s)/phrase(s) after edit | | Type of conversion |
|---|---|---|---|---|
| 1. Shortened word/phrase | | | | |
| "practicability" | Combination of word(s)/phrase(s) | "feasibility" | Word/phrase | Replacement |
| "specific samples" | Word/phrase | "examples" | Word/phrase | Replacement |
| 2. Lengthened word/phrase | | | | |
| "a better disclosure of invention" | Combination of word(s)/phrase(s) | "better disclosure statement of invention" | Combination of word(s)/phrase(s) | Replacement |
| "their own" | Word/phrase | "inventors'" | Word/phrase | Replacement |
| "persons who evaluate" | Combination of word(s)/phrase(s) | "persons who evaluate and determine" | Combination of word(s)/phrase(s) | Replacement |
| "to understand" | Combination of word(s)/phrase(s) | "to correctly understand" | Combination of word(s)/phrase(s) | Replacement |
| "in order to" | Word/phrase | "is required. To that end" | Combination of word(s)/phrase(s) | Replacement |
| "explain by using" | Combination of word(s)/phrase(s) | "clearly explain by tactically using" | Combination of word(s)/phrase(s) | Replacement |

In the example in item D (2) (323), the lines of text (303) under edit needs to be increased from three to four so that the text fits in the display range (four lines) (314) determined in item C (2) of FIG. 3B. Suppose, however, that the user has changed the original word "practicability" to "feasibility"

ber of words/phrases and combinations of words, phrases or a word(s) and a phrase(s) (the number of expressions) in the text under edit including the edited word "inventors'" are changed. A total of seven expressions have been changed in the example given below.

TABLE 3

| Word/phrase or combination of word(s)/phrase(s) before edit | Word/phrase or combination of word(s)/phrase(s) after edit | | Type of conversion |
| --- | --- | --- | --- |
| 1. Lengthened word/phrase | | | |
| "their own" | Word/phrase | "inventors'" Word/phrase | Replacement |
| 2. Shortened word/phrase | | | |
| "generally speaking" | Word/phrase | "generally" Word/phrase | Replacement |
| "original idea" | Word/phrase | "idea" Word/phrase | Replacement |
| "practicability" | Combination of word(s)/phrase(s) | "feasibility" Word/phrase | Replacement |
| "show clear processes" | Combination of word(s)/phrase(s) | "of clear processes" Combination of word(s)/phrase(s) | Rearrangement |
| "specific samples" | Word/phrase | "examples" Word/phrase | Replacement |
| "by using" | Combination of word(s)/phrase(s) | "using" Word/phrase | Replacement |
| "need to" | Combination of word(s)/phrase(s) | "must" Combination of word(s)/phrase(s) | Replacement |

In the example in item D (3) (325), the text (303) (120 characters) under edit needs to be shortened so that the text falls within the display range predetermined in item C (3) in FIG. 3B (72 characters) (316). Suppose, however, that the user has changed (converted) the original word "their own" to "inventors'" during editing of this document. In that case, the change has been stored in the edit history data (213). Accordingly, the change unit (204) of the apparatus (101) refers to the edit history data (213) in the storage unit (210) to change the word "their own" to "inventors'". As a result of the change, the number of characters in the text under edit including the edited word "inventors'" increases from the number of the characters in the previous text. The change unit (204) therefore refers to the word/phrase dictionary (211), the rearrangement dictionary (212), the edit history data (213) and/or the profile data (214) to further change a word or phrase or a combination of words, phrases or a word(s) and a phrase(s) other than the edited word "inventors'" to another word or phrase or another combination of words, phrases or a word(s) and a phrase(s) so that the text under edit including the edited word "inventors'" falls within the display range (72 characters) (316) predetermined in item C (3) (315) (see the section "Shortened word/phase" given above).

Figure 3D:
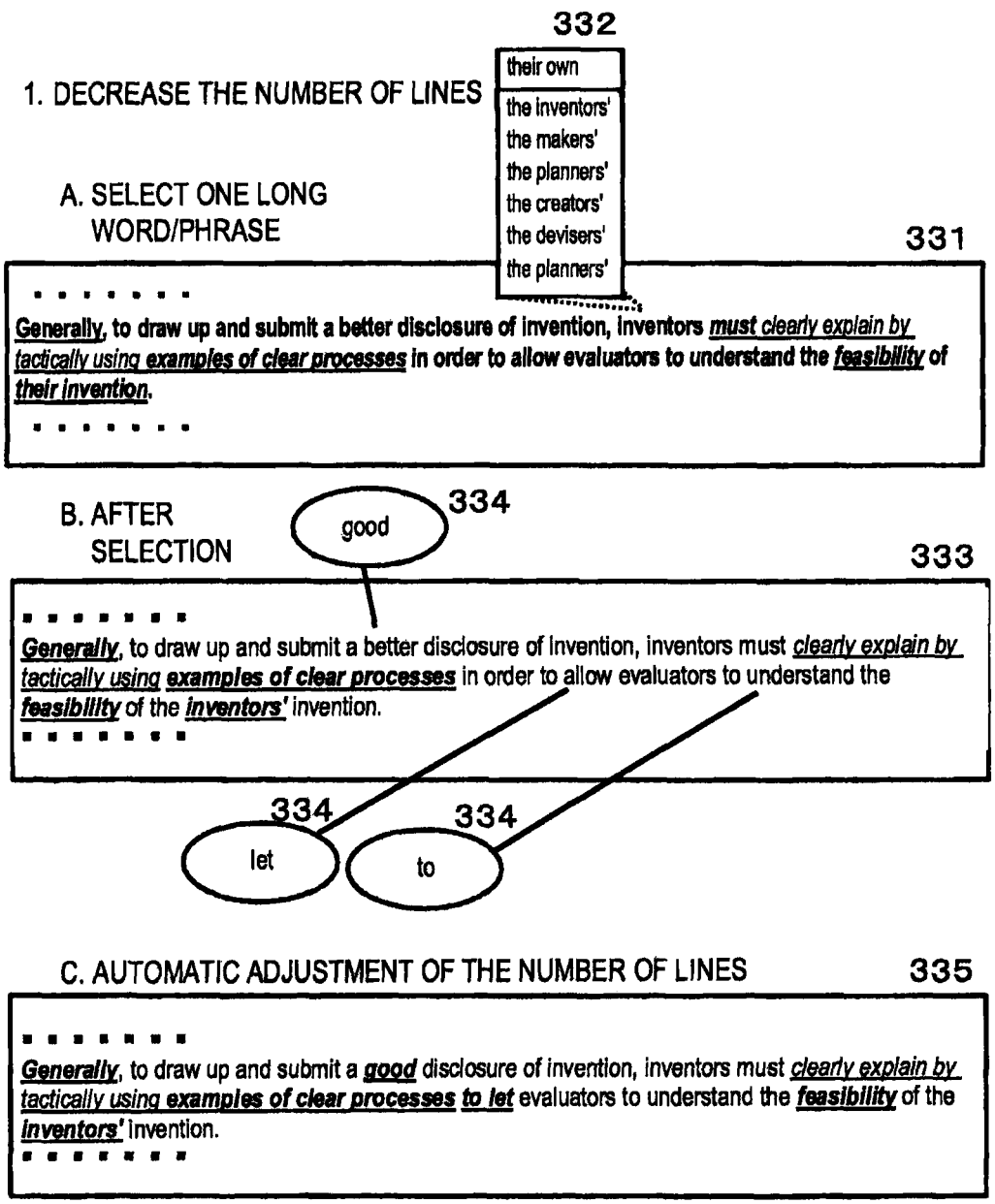
FIG. 3D illustrates an example in which a word or a phrase or a combination of words, phrases, or a word(s) and a phrase(s) in a result of editing is adjusted in the case where the number of lines is decreased as illustrated in FIG. 3C.

FIG. 3D illustrates an example in which a word or phrase or a combination of words, phrases or a word(s) and a phrase(s) in the edited text in the case where the number of lines is decreased as illustrated in item D (1) in FIG. 3C according to an embodiment. Item D (1) (321) in FIG. 3C illustrates the result of automatic editing (optimization) performed so that the text (303) to be edited illustrated in (302) of FIG. 3A falls within the predetermined range (two lines) (312) in item C (1) (311) in FIG. 3B. However, when words and phrases have not accumulated enough in the word/phrase dictionary (211) or the edit history data (213), it is possible that text obtained as a result of the optimization is not natural or smooth.

The text illustrated in item E (1) (A) (331) in FIG. 3D is the same as the text illustrated in item D (1) (321) in FIG. 3C. The selection unit (206) of the apparatus (101) enables the user to select the converted word or combination of words. The converted word or combination of words is visualized in such a way that the user can readily identify the converted word or combination of words. While the visualization is implemented by displaying the converted word or combination of words in italics in item E (1) (A) (331), the visualization may be implemented by displaying the word or combination of words in a different color, for example. In item E (1) (A) (331), in response to the user selecting the word "their" with the mouse, conversion candidates for the word "their" appears in a popup window (332). The conversion candidates displayed may be a word before the optimization (that is, a word input by the user), a word obtained from the edit history data (213), a word obtained from the profile data (214), or a word helps decrease the number of lines (that is, a word or phrase that is synonymous with the word "their" and has fewer characters, or has the fewest characters), for example. The popup window (332) displays the word "their own'" (the word before the optimization) and the word "the inventors'" (obtained from the edit history data (213)), and the words "the makers'", "the authors'", "the creators'", "the devisers'" and "the authors'", which are synonyms with the word "their", help decrease the number of lines (and the number of characters), and have been extracted from the dictionary (211) as conversion candidates.

Item E (1) (B) (333) in FIG. 3D illustrates text when the user selects "inventors'". Because the word "their" has been replaced with the word "inventors'", the text under edit is displayed in three lines, exceeding the predetermined range (two lines) illustrated in item C (1) (311) in FIG. 3B.

In one embodiment of, therefore, the replacement unit (205) of the apparatus (101) displays conversion candidates in order to change a word or phrase or a combination of words, phrases or a word(s) and a phrase(s) in the text including the word "inventors'" so that the text including the word "inventors'" falls within the predetermined range (two lines) (312) illustrated in item C (1) (311) in FIG. 3B. The conversion candidates may be displayed in a popup window (334), for example, as illustrated in item E (1) (B) (333). Alternatively, the replacement unit (205) may display a preview of text that can be obtained through optimization of the text including the word "inventors'" as illustrated in item E (1) (C) (335) in FIG. 3D, instead of displaying the conversion candidates in a popup window (334).

When the user accepts the conversion candidate in a popup window (334) illustrated in item E (1) (B) (333) or the preview version illustrated in item E (1) (C) (335), the user can press the enter key on the keyboard to confirm the text in which the word has been replaced with the conversion candidate in the popup window (334) or the text appearing in the preview.

Alternatively, in response to the user selecting the conversion candidate "inventors'" in the popup window (332) in item E (1) (A) (331), the replacement unit (205) automatically optimizes the text including the word "inventors'" so that the text including the word "inventors'" falls within the predetermined range (two lines) (312) illustrated in item C (1) (311) in FIG. 3B. The result of the optimization is illustrated in item E (1) (C) (335). The edits made are illustrated in Table 4 given below. The optimization may change in total a minimum number of words/phrases and combinations of words, phrases or a word(s) and a phrase(s) (the number of expressions) in the text including the edited word "inventors'". A total of three expressions have been changed in the example given below.

TABLE 4

1. Shortened word/phrase

| Word/phrase or combination of word(s)/phrase(s) before edit | | Word/phrase or combination of word(s)/phrase(s) after edit | | Type of conversion |
|---|---|---|---|---|
| "better" | Combination of word(s)/phrase(s) | "good" | Word/phrase | Replacement |
| "allow" | Word/phrase | "let" | Word/phrase | Replacement |
| "in order to" | Word/phrase | "to" | Word/phrase | Replacement |

FIG. 3E illustrates an example in which one word or phrase or one combination of words, phrase or a word(s) and a phrase(s) in the text edited is adjusted to increase the number of lines as illustrated in item D (2) in FIG. 3C according to an embodiment. Item D (2) (323) in FIG. 3C illustrates the result of editing (optimization) automatically performed so that the text (303) under edit illustrated in (302) in FIG. 3A falls within the predetermined range (four lines) (314) illustrated in item C (2) (313) in FIG. 3B. However, when words and phrases have not accumulated enough in the word/phrase dictionary (211) or the edit history data (213), it is possible that text obtained as a result of the optimization is not natural or smooth. Therefore in one embodiment, the replacement unit (205) of the apparatus (101) enables reconversion of a converted word or phrase or a converted combination of words, phrases or a word(s) and a phrase(s) in optimized text.

Text illustrated in item F (2) (A) (341) in FIG. 3F is the same as the text illustrated in item D (2) (323) in FIG. 3C. The selection unit (206) of the apparatus (101) enables the user to select the converted word or phrase or the converted combination of words, phrases or a word(s) and a phrase(s). The converted word or phrase or the converted combination of words, phrases or a word(s) and a phrase(s) is visualized so that the user can readily identify the converted word or phrase or the combination. While the visualization is implemented by displaying the converted word or phrase or the converted combination of words, phrases or a word(s) and a phrase(s) in italics in item F (2) (A) (341), the visualization may be implemented by displaying the word or phrase or the combination of words, phrases or a word(s) and a phrase(s) in a different color, for example. In item F (2) (A) (341), in response to the user selecting the expression "persons who evaluate and determine" with the mouse, conversion candidates for the expression "persons who evaluate and determine" appears in a popup window (342). The conversion candidates displayed may be a word before the optimization (that is, a word input by the user), a word obtained from the edit history data (213), a word obtained from the profile data (214), or a word that helps increase the number of lines (that is, a word or phrase that is synonymous with the expression "persons who evaluate and determine" and has many characters, or having the most characters), for example. The popup window (342) displays the expression "persons who evaluate" (the expression before the optimization) and the word "evaluators" (obtained from the edit history data (213)), and the words "in-house evaluators", "the department of intellectual property", "the patent firm", "their manager", "patent attorneys" and "their supervisor", which are synonyms with the expression "persons who evaluate and determine", help increase the number of lines (and the number of characters), and have been extracted from the dictionary (211) as conversion candidates.

Item F (2) (B) (343) in FIG. 3E illustrates text that appears when the user selects "evaluators". Because the expression "persons who evaluate and determine" has been replaced with the word "evaluators", the text under edit is displayed in three lines, which is shorter than the predetermined range (four lines) (314) illustrated in item C (2) (313) in FIG. 3B.

In one embodiment, therefore, the replacement unit (205) of the apparatus (101) displays conversion candidates in order to change a word or phrase or a combination of words, phrases or a word(s) and a phrase(s) in the text including the word "evaluators" so that the text including the word "inventors'" falls within the predetermined range (four lines) (314) illustrated in item C (2) (313) in FIG. 3B. The conversion candidates may be displayed in a popup window (344), for example, as illustrated in item F (2) (B) (343). Alternatively, the replacement unit (205) may display a preview of text that can be obtained through optimization of the text including the word "inventors'" as illustrated in item F (2) (C) (345) in FIG. 3E, instead of displaying the conversion candidates in a popup window (344). When the user accepts the conversion candidate in a popup window (344) illustrated in item F (2) (B) (343) or the preview version illustrated in item F (2) (C) (345), the user can press the enter key on the keyboard to confirm the text in which the word has been replaced with the conversion candidate in the popup window (344) or the text displayed in the preview.

Alternatively, in response to the user selecting the conversion candidate "evaluators" in the popup window (342) in item F (2) (A) (341), the replacement unit (205) automatically optimizes the text including the word "evaluators" so that the text including the word "evaluators" falls within the predetermined range (four lines) (314) illustrated in item C (2) (313) in FIG. 3B. The result of the optimization is illustrated in item F (2) (C) (345). The edits made are illustrated in Table 5 given below. The optimization may change in total a minimum number of words/phrases and combinations of words, phrases or a word(s) and a phrase(s) (the number of expressions) in the text including the edited word "evaluators". A total of two expressions have been changed in the example given below.

TABLE 5

1. Lengthened word/phrase

| Word/phrase or combination of word(s)/phrase(s) before edit | | Word/phrase or combination of word(s)/phrase(s) after edit | | Type of conversion |
|---|---|---|---|---|
| "must" | Combination of word(s)/phrase(s) | "need to" | Combination of word(s)/phrase(s) | Replacement |
| "show clear processes" | Combination of word(s)/phrase(s) | "clear and easy-to-understand processes" | Word/phrase | Rearrangement |

While FIGS. 3A to 3E illustrate examples in which the text in a specified portion to be edited is one sentence, embodiments may also be applied to a case where text in a specified portion to be edited is made up of a plurality of sentences, in the same way as in FIGS. 3A to 3E. For example, when a specified portion specified to edit includes a first sentence and a second sentence, at least one of a word and a phrase and a combination of words, phrases or a word(s) and a phrase(s) in the first sentence can be replaced with a shorter one(s) and at least one of a word and a phrase and a combination of words, phrases and or word(s) and a phrase(s) in the second sentence can be replaced with a longer one(s).

FIG. 4A illustrates an example of a document (in English) being edited (item A) and an example of text (item B) in which a portion of the document (in English) to which editing is to be applied is selected, according to an embodiment. Item A in FIG. 4A illustrates an example of a document (401) being edited. It is assumed here that justification is automatically performed during creation of the document. It is assumed that the text being edited in item A is a portion of the document under edit and that four lines of the text have been input in that portion.

Item B in FIG. 4A illustrates an example (402) of a process in which the user specifies or selects a range to which editing is to be applied (hereinafter also referred to as an object of editing) (402). The user can specify or select text to edit by moving a finger on a touch panel (touch screen), for example. In item B, the text (403) enclosed in a dashed box has been specified or selected as text to be edited (402). Text specified or selected can be one or more sentences, sentences that can be specified on a paragraph by paragraph basis or on a page by page basis, or the entire document under edit. The appearance of text under edit is altered so that the text can be distinguished from the rest of the text for visual identification by the user. While the text under edit is enclosed in the dashed box in item B, this is illustrative only. For example, text under edit may be visualized in such a way that the text under edit appears in a different color from the rest of the text.

FIG. 4B illustrates exemplary settings of a predetermined range according to an embodiment in the editing of the document illustrated in FIG. 4A. The range can be set with a mouse or a cursor, for example. When the mouse is used, the range can be set by moving up and down the (dashed) frame around the region in which the range is to be set. The set range can be visualized in such a way that the user can readily identify the range. In the example in FIG. 4B, the predetermined range is a display range. It is assumed in the example that the application does not change a font, a font size, the number of characters per line, and a line spacing. Item C (1) (411) illustrates that a predetermined display range (412) is two lines. That is, item C (1) (411) illustrates an example in which the document is edited so that the three lines of text (403) to be edited selected in item B (402) in FIG. 4A changes to two lines of text (optimization for decreasing the number of lines).

Item C (2) (413) illustrates that a predetermine display range is five lines. That is, item C (2) (413) illustrates an example in which the text (403) to be edited selected in item B (402) in FIG. 3A is edited in such a way that the four lines of text (403) under edit changes to five lines of text (optimization for increasing the number of lines). While the text (403) to be edited in Item B (402) in FIG. 4A is one sentence, text to be edited may be one or more sentences, for example one paragraph, one page or one entire document.

Item C (3) (415) illustrates that a predetermined display range is not lines but a certain display range (display region) (416) specified by the user. That is, item C (2) (415) illustrates an example in which the text to be edited selected in item B (402) in FIG. 4A is edited in such a way that the text falls within the display range (416) (change of a display range). The number of lines of the text under edit displayed in the display range (416) is determined by the size of the display range because the font, the font size, the number of characters per line, and the line spacing are not changed as stated above. The number of lines in this example is four.

FIG. 4C illustrates the result of editing automatically performed so that the text to be edited selected in item B (402) in FIG. 4A falls within the predetermined range illustrated in FIG. 4B according to an embodiment. Item D (1) (421) illustrates the result of editing (optimization) automatically performed so that the text (403) under edit illustrated in (402) of FIG. 4A falls within the predetermined range (three lines) (412) illustrated in item C (1) (411) in FIG. 4B. The edits made are illustrated in Table 6 given below. The further change may change the text so that in total a minimum number of words/phrases and combinations of words, phrases or a word(s) and a phrase(s) (the number of expressions) are changed in the text including the edited word "demonstrate". A total of two expressions (the fewest expressions) have been changed in the example given below

TABLE 6

| Word/phrase or combination of word(s)/ phrase(s) before edit | Word/phrase or combination of word(s)/ phrase(s) after edit | | Type of conversion |
|---|---|---|---|
| 1. Lengthened word/phrase | | | |
| "show" | Word/phrase | "demonstrate" | Word/ phrase | Replacement |
| 2. Shortened word/phrase | | | |
| "original idea" | Combination of word(s)/ phrase(s) | "invention" | Word/ phrase | Replacement |
| "expected implementation" | Combination of word(s)/ phrase(s) | "feasibility" | Word/ phrase | Replacement |

In the example in item D (1) (421), the four lines of text (403) under edit needs to be decreased to two lines so that the text falls within the display range (412) predetermined in item C (1) in FIG. 4B (three lines). Suppose, however, that the user has changed (converted) the original word "show" to "demonstrate" during editing of this document. In that case, the change made has been recorded in the edit history data (213). Accordingly, the change unit (204) of the apparatus (101) refers to the edit history data (213) in the storage unit (210) to change the original word "show" to "demonstrate". As a result of the change, the number of characters in the text under edit including the edited word "demonstrate" increases from the number of characters in the original text. The change unit (204) therefore refers to the word/phrase dictionary (211), the edit history data (213) and/or the profile data (214) to change a word or phrase or a combination of words, phrases or a word(s) and a phrase(s) other than the edited word "demonstrate" to another word or phrase or another combination of words, phrases or a word(s) and a phrase(s) so that the text under edit including the edited word "demonstrate" falls within the display range (two lines) (412) determined in item C (1) (411) (see the section "Shortened word/phrase" given above).

Item D (2) (423) illustrates the result of editing automatically performed so that the text (403) to be edited illustrated in (402) of FIG. 4A falls within the range (five lines) (414) illustrated in item C (2) (413) of FIG. 3B. The edits made are illustrated in Table 7 given below. The editing (optimization) may change the text so that in total a minimum number of words/phrases and combinations of words, phrases or a word(s) and a phrase(s) (the number of expressions) in the text including the edited word "feasibility" are changed. A total of three expressions have been changed in the example given below.

TABLE 7

| Word/phrase or combination of word(s)/phrase(s) before edit | | Word/phrase or combination of word(s)/phrase(s) after edit | | Type of conversion |
|---|---|---|---|---|
| 1. Shortened word/phrase | | | | |
| "expected implementation" | Combination of word(s)/phrase(s) | "feasibility" | Word/phrase | Replacement |
| 2. Lengthened word/phrase | | | | |
| "to draw up" | Combination of word(s)/phrase(s) | "in order to draw up" | Combination of word(s)/phrase(s) | Replacement |
| "inventors" | Word/phrase | "the persons who invent the idea" | Combination of word(s)/phrase(s) | Replacement |
| "evaluators" | Word/phrase | "persons who estimate officially the worth or value or quality of it" | Combination of word(s)/phrase(s) | Replacement |

In the example in item D (2) (423), the four lines of text (403) under edit needs to be increased to five lines so that the text fits the display range (five lines) (414) predetermined in item C (2) of FIG. 4B. Suppose, however, that the user has changed "expected implementation" to "feasibility" during the editing of a document other than this document in the past. Then, the change unit (204) of the apparatus (101) refers to the profile data (214) in the storage unit (210) to change the expression "expected implementation" to "feasibility". As a result of the change, the number of characters in the text under edit including the words "feasibility" decreased from the number of characters in the text before the change. The change unit (204) therefore refers to the word/phrase dictionary (211), the rearrangement dictionary (212), the edit history data (213) and/or the profile data (214) to further change a word or phrase or a combination of words, phrase and or a word(s) and a phrase(s) other than the edited word "feasibility" to another word or phrase or another combination of words, phrases or a word(s) and a phrase(s) so that the text under edit including the edited word "feasibility" fits the display range (five lines) (414) predetermined in item C (2) (414) (see the section "Lengthened word/phrase" given above).

Item D (3) (425) illustrates the result of automatic editing (optimization) performed so that the text (403) under edit in (402) of FIG. 4A falls within a predetermined display range (the right-hand three-fifths of the text) illustrated in item C (3) (415) in FIG. 4B (416). The edits made are illustrated in Table 8 given below. The additional change may change the text so that in total a minimum number of words/phrases and combinations of words, phrases or a word(s) and a phrase(s) (the number of expressions) in the text under edit including the edited word "demonstrate" are changed. A total of five expressions have been changed in the example given below.

TABLE 8

| Word/phrase or combination of word(s)/phrase(s) before edit | | Word/phrase or combination of word(s)/phrase(s) after edit | | Type of conversion |
|---|---|---|---|---|
| 1. Lengthened word/phrase | | | | |
| "show" | Word/phrase | "demonstrate" | Word/phrase | Replacement |
| 2. Shortened word/phrase | | | | |
| "Generally speaking" | Combination of word(s)/phrase(s) | "Generally" | Word/phrase | Replacement |
| "inventors" | Word/phrase | "persons" | Word/phrase | Replacement |

TABLE 8-continued

| Word/phrase or combination of word(s)/phrase(s) before edit | | Word/phrase or combination of word(s)/phrase(s) after edit | | Type of conversion |
|---|---|---|---|---|
| "original idea" | Combination of word(s)/phrase(s) | "invention" | Word/phrase | Replacement |
| "by using" | Combination of word(s)/phrase(s) | "with" | Word/phrase | Replacement |
| "expected implementation" | Combination of word(s)/phrase(s) | "feasibility" | Word/phrase | Replacement |

In the example in item D (3) (425), the text (403) under edit needs to be shortened so that the text falls within the display range predetermined in item C (3) in FIG. 4B (416). Suppose, however, that the user has changed (converted) the original word "show" to "demonstrate" during editing of this document. In that case, the change has been stored in the edit history data (213). Accordingly, the change unit (204) of the apparatus (101) refers to the edit history data (213) in the storage unit (210) to change the word "show" to "demonstrate". As a result of the change, the number of characters in the text under edit including the edited word "demonstrate" increases from the number of the characters in the text before the change. The change unit (204) therefore refers to the word/phrase dictionary (211), the rearrangement dictionary (212), the edit history data (213) and/or the profile data (214) to further change a word or phrase or a combination of words, phrases or a word(s) and a phrase(s) other than the edited word "demonstrate" to another word or phrase or another combination of words, phrases or a word(s) and a phrase(s) so that the text under edit including the edited word "demonstrate" falls within the predetermined display range (the right-hand three-fifths of the text) (416) in item C (3) (415) (see the section "Shortened word/phase" given above).

FIG. 4D illustrates an example in which a word or phrase or a combination of words, phrases or a word(s) and a phrase(s) in the edited text in the case where the number of lines is decreased as illustrated in item D (1) in FIG. 4C according to an embodiment. Item D (1) (421) in FIG. 4C illustrates the result of automatic editing (optimization) performed so that the text (403) to be edited illustrated in (402) of FIG. 4A falls within the predetermined range (three lines) (412) in item C (1) (411) in FIG. 4B. However, when words and phrases have not accumulated enough in the word/phrase dictionary (211) or the edit history data (213), it is possible that text obtained as a result of the optimization is not natural or smooth. Therefore in one embodiment, the replacement unit (205) of the apparatus (101) enables reconversion of a converted word or phrase or a converted combination of words, phrases or a word(s) and a phrase(s) in optimized text.

Text illustrated in item E (1) (A) (431) in FIG. 4D is the same as the text illustrated in item D (1) (421) in FIG. 4C. The selection unit (206) of the apparatus (101) enables the user to select the converted word. The converted word is visualized in such a way that the user can readily identify the converted word. While the visualization is implemented by displaying the converted word in italics in item E (1) (A) (431), the visualization may be implemented by displaying the word in a different color, for example. In item E (1) (A) (431), in response to the user touching the word "feasibility" on a touch panel, conversion candidates for the word "feasibility" appears in a popup window (432). The conversion candidates displayed may be a word before the optimization (that is, a word input by the user), a word obtained from the edit history data (213), a word obtained from the profile data (214), or a word that helps decrease the number of lines (that is, decrease the number of characters), for example. The popup window (432) displays the expression "expected implementation" (the expression before the optimization) and the word "viability" (obtained from the edit history data (213)), and the words "usefulness", "workability", "practicability", "implementation", and "feasibility study", which are synonyms with the word "feasibility", help decrease the number of lines (the number of characters), and is extracted from the dictionary (211) as conversion candidates. Item E (1) (B) (433) in FIG. 4D illustrates text when the user selects "expected implementation". Because the word "feasibility" has been replaced with expression "expected implementation", the text under edit is displayed in four lines, exceeding the predetermined range (three lines) (412) illustrated in item C (1) (412) in FIG. 4B.

In one embodiment, therefore, the replacement unit (205) of the apparatus (101) displays conversion candidates in order to change a word or phrase or a combination of words, phrases or a word(s) and a phrase(s) in the text including the expression "expected implementation" so that the text including the word "expected implementation" falls within the predetermined range (three lines) (412) illustrated in item C (1) (411) in FIG. 4B. The conversion candidates may be displayed in a popup window (434), for example, as illustrated in item E (1) (B) (433). Alternatively, the replacement unit (205) may display a preview of text that can be obtained through optimization of the text including the word "expected implementation" as illustrated in item E (1) (C) (435) in FIG. 4D, instead of displaying the conversion candidates in a popup window (434).

When the user accepts the conversion candidate in a popup window (434) illustrated in item E (1) (B) (433) or the preview version illustrated in item E (1) (C) (435), the user can press the enter key on the keyboard to confirm the text in which the word has been replaced with the conversion candidate in the popup window (434) or the text displayed as the preview. Alternatively, in response to the user selecting the conversion candidate "expected implementation" in the popup window (432) in item E (1) (A) (431), the replacement unit (205) automatically optimizes the text including the word "expected implementation" so that the text including the word "expected implementation" falls within the predetermined range (three lines) (412) illustrated in item C (1) (411) in FIG. 4B. The result of the optimization is illustrated in item E (1) (C) (435). The edits made are illustrated in Table 9 given below. The optimization may change in total a minimum number of words/phrases and combinations of words, phrases or a word(s) and a phrase(s) (the number of expressions) in the text including the edited word "expected implementation". A total of two expressions (the minimum) have been changed in the example given below.

TABLE 9

| 1. Shortened word/phrase | | | | |
|---|---|---|---|---|
| Word/phrase or combination of word(s)/ phrase(s) before edit | | Word/phrase or combination of word(s)/ phrase(s) after edit | | Type of conversion |
| "to draw up" | Combination of word(s)/ phrase(s) | "to make" | Combination of word(s)/ phrase(s) | Replacement |
| "it is required for inventors that" | Combination of word(s)/ phrase(s) | "inventors are required that" | Combination of word(s)/ phrase(s) | Replacement |

FIG. 4E illustrates an example in which one word or phrase or one combination of words, phrase or a word(s) and a phrase(s) in the text edited is adjusted to increase the number of lines as illustrated in item D (2) in FIG. 4C according to an embodiment. Item D (2) (423) in FIG. 4C illustrates the result of editing (optimization) automatically performed so that the text (403) under edit illustrated in (402) in FIG. 4A falls within the predetermined range (five lines) (414) illustrated in item C (2) (413) in FIG. 4B. However, when words and phrases have not accumulated enough in the word/phrase dictionary (211) or the edit history data (213), it is possible that text obtained as a result of the optimization is not natural or smooth. Therefore in one embodiment, the replacement unit (205) of the apparatus (101) enables reconversion of a converted word or phrase or a converted combination of words, phrases or a word(s) and a phrase(s) in optimized text.

Text illustrated in item F (2) (A) (441) in FIG. 3F is the same as the text illustrated in item D (2) (423) in FIG. 4C. The selection unit (206) of the apparatus (101) enables the user to select the converted word or phrase or the converted combination of words, phrases or a word(s) and a phrase(s). The converted word or phrase or the converted combination of words, phrases or a word(s) and a phrase(s) is visualized so that the user can readily identify the converted word or phrase or the combination. While the visualization is implemented by displaying the converted word or phrase or the converted combination of words, phrases or a word(s) and a phrase(s) in italics in item F (2) (A) (441), the visualization may be implemented by displaying the word or phrase or the combination of words, phrases or a word(s) and a phrase(s) in a different color, for example. In item F (2) (A) (441), in response to the user selecting the expression "demonstrate" with the mouse, conversion candidates for the expression "demonstrate" appears in a popup window (442). The conversion candidates displayed may be a word before the optimization (that is, a word input by the user), a word obtained from the edit history data (213), a word obtained from the profile data (214), or a word that helps increase the number of lines (that is, a word or phrase that is synonymous with the expression "demonstrate" and has many characters, or having the most characters), for example. The popup window (442) displays the expression "show" (the expression before the optimization) and the word "indicate" (obtained from the edit history data (213)), and the words "present", "exhibit", and "offer", which are synonyms with the expression "demonstrate", help increase the number of lines (and the number of characters), and have been extracted from the dictionary (211) as conversion candidates.

Item F (2) (B) (443) in FIG. 4E illustrates text that appears when the user selects "show". Because the expression "demonstrate" has been replaced with the word "show", the text under edit is displayed in three lines, which is shorter than the predetermined range (five lines) (414) illustrated in item C (2) (413) in FIG. 4B.

In one embodiment, therefore, the replacement unit (205) of the apparatus (101) displays conversion candidates in order to change a word or phrase or a combination of words, phrases or a word(s) and a phrase(s) in the text including the word "show" so that the text including the word "show" falls within the predetermined range (five lines) (414) illustrated in item C (2) (413) in FIG. 4B. The conversion candidates may be displayed in a popup window (444), for example, as illustrated in item F (2) (B) (443). Alternatively, the replacement unit (205) may display a preview of text that can be obtained through optimization of the text including the word "show" as illustrated in item F (2) (C) (345) in FIG. 4E, instead of displaying the conversion candidates in a popup window (444).

When the user accepts the conversion candidate in a popup window (444) illustrated in item F (2) (B) (443) or the preview version illustrated in item F (2) (C) (445), the user can press the enter key on the keyboard to confirm the text in which the word has been replaced with the conversion candidate in the popup window (444) or the text displayed in the preview. Alternatively, in response to the user electing the conversion candidate "show" in the popup window (442) in item F (2) (A) (441), the replacement unit (205) automatically optimizes the text including the word "show" so that the text including the word "show" falls within the predetermined range (five lines) (414) illustrated in item C (2) (413) in FIG. 4B. The result of the optimization is illustrated in item F (2) (C) (445). The edits made are illustrated in Table 5 given below. The optimization may change in total a minimum number of words/phrases and combinations of words, phrases or a word(s) and a phrase(s) (the number of expressions) in the text including the edited word "show". Only one expression (the minimum number of expressions) has been changed in the example given below.

TABLE 10

1. Lengthened word/phrase

| Word/phrase or combination of word(s)/ phrase(s) before edit | Word/phrase or combination of word(s)/ phrase(s) after edit | Type of conversion |
|---|---|---|
| "samples" Word/phrase | "a plurality of samples" Combination of word(s)/phrase(s) | Replacement |

While FIGS. 4A to 4E illustrate examples in which the text in a portion specified to be edited is one sentence, embodiments may also be applied to a case where text in a specified to be edited is made up of a plurality of sentences, in the same way as in FIGS. 4A to 4E. For example, if a specified portion to be edited includes a first sentence and a second sentence, at least one of a word and a phrase and a combination of words, phrases or a word(s) and a phrase(s) in the first sentence can be replaced with a shorter one(s) and at least one of a word and a phrase and a combination of words, phrases and or word(s) and a phrase(s) in the second sentence can be replaced with a longer one(s).

FIG. 5A illustrates an exemplary word/phrase dictionary that can be used with an embodiment for replacing a word or phrase or a combination of words, phrases, or a word(s) and a phrase(s) with another word or phrase or another combination of words, phrases or a word(s) and a phrase(s). The word/phrase dictionary (501) contains, for example, a synonym (which is a word or phrase or a combination of words or phrases or a word(s) and a phrase(s)) corresponding to a word or phrase or a combination of words, phrases or a word(s) and a phrase(s), or an expression (which is a word or phrase or a combination of words, phrases or a word(s) and a phrase(s)) equivalent to a word or phrase or a combination of words, phrases, or a word(s) and a phrase(s). A synonym corresponding to a word or phrase or a combination of words, phrases or a word(s) and a phrase(s) can be a word or phrase that is synonymous with a word or phrase, a combination of words, phrases or a word(s) and a phrase(s) that is synonymous with a combination of words, phrases or a word(s) and a phrase(s), a word or phrase that is an expression equivalent to a word or phrase, and a combination of words, phrases or a word(s) and a phrase(s) that is an expression equivalent to a word or phrase, though these possibly does not apply to some languages.

The dictionary further contains the following information relating to a synonym or an equivalent expression Identifier (ID) associated with word or phrase or one combination of words, phrases or a word(s) and a phrase(s); Type (Double-byte character (dbcs) or single-byte character (sbcs)); Size, the length of a word or phrase in bytes; Part of speech (Verb, noun, adjective, adverb, etc.); and List of identifiers of synonyms or equivalent expressions.

For example, the following conversion candidates (1) and/or (2) below can be displayed using the word/phrase dictionary (501):

(1) When converting the word "inventors'" to shorten a text: In Japanese: "their own" (word before optimization), "their", makers'", "authors'", "creators'", "devisers'", "builders'", planners'", . . . , may be displayed in this order. In English: "expected implementation" (words before optimization), "usefulness", "workability", "practicability", "implementation", "feasibility study", . . . , may be displayed in this order.

(2) When converting the word "makers'" to lengthen text. In Japanese: "their own" (word before optimization), "inventors'", "planners'", "creators'", "devisers'", "builders'", "producers'", "authors'", . . . , may be displayed in this order. In English: "Expected implementation" (words before optimization), "feasibility study", "implementation", "practicability", "workability", "usefulness", . . . , may be displayed in this order.

A word or phrase or a combination of words, phrases or a word(s) and a phrase(s) can be added to the word/phrase dictionary (501) manually by a user or automatically by a computer monitoring conversions made by a user. The word/phrase dictionary (501) can be implemented by a method known to those skilled in the art, such as a dictionary definition method and a normalization method, for example.

FIG. 5B illustrates an example of a rearrangement dictionary that can be used with an embodiment for rearranging a plurality of words or phrases to other words or phrases. Rearranging words and/or phrases in a combination of words, phrases or a word(s) and a phrase(s) can lengthen or shorten a sentence. For example, if parts of speech are arranged in the order "adjective+noun+verb+noun" in Japanese, it is likely that the verb can be omitted by interchanging the places of a noun and the adjective. Likewise, in English, for example, words can be rearranged to length or shorten a text. Rules for rearrangement can vary from language to language (see the following examples in English and Japanese). Tables 11 and 12 given below illustrate the examples in Japanese and English.

TABLE 11

(Japanese):

| | 変更前 | 変更後 |
|---|---|---|
| 例1 | 「明白な方法がわ形容詞(かる」例 + 名詞 + 助詞 + 形容詞) | 「方法が明白な」例(名詞 + 助詞 + 形容詞) |
| 例2 | 「複雑な処理を 行う」プロセス(形容詞 + 名詞 + 助詞 + 形容詞) | 「処理が複雑 な」プロセス名詞 + 助詞 + 形容詞) |
| 例3 | 「特別な素材 で作った」服(形容詞 + 名詞 + 助詞 + 形容詞) | 「素材が特 別な」服(名詞 + 助詞 + 形容詞) |

TABLE 12

(English):

| | From | To |
|---|---|---|
| Example 1 | "Example method defined clearly" (noun1 + noun2 + verb + adj) | "Clear example method" (adj + noun + noun) |
| | "Process consists of complex computing.)" | "Complex computing process" |
| Example 2 | (noun1 + verb + prep + adj + noun2) | (adj + noun2 + noun1) |
| Example 3 | "Clothing made from natural fabrics" (noun1 + verb + prep + adj + noun2) | "Natural fabric clothing" (adj + noun2 + noun1) |

The rearrangement dictionary (502) contains the following information: Identifier (ID) associated with an arrangement of words; Effect (effect of rearrangement of words, for example increase or decrease in the number of characters); Arrangement of words before change (From), which may be expressed by a set of parts of speech; and Arrangement of words after change (To), which may also be expressed by a set of parts of speech. The rearrangement dictionary (502) can be implemented as the same dictionary file as the word/phrase dictionary (501) or implemented as a dictionary file separate from the word/phrase dictionary (501). The rearrangement dictionary (502) can be implemented by a method known to those skilled in the art, such as a dictionary definition method and a normalization method, for example.

Figure 6A:
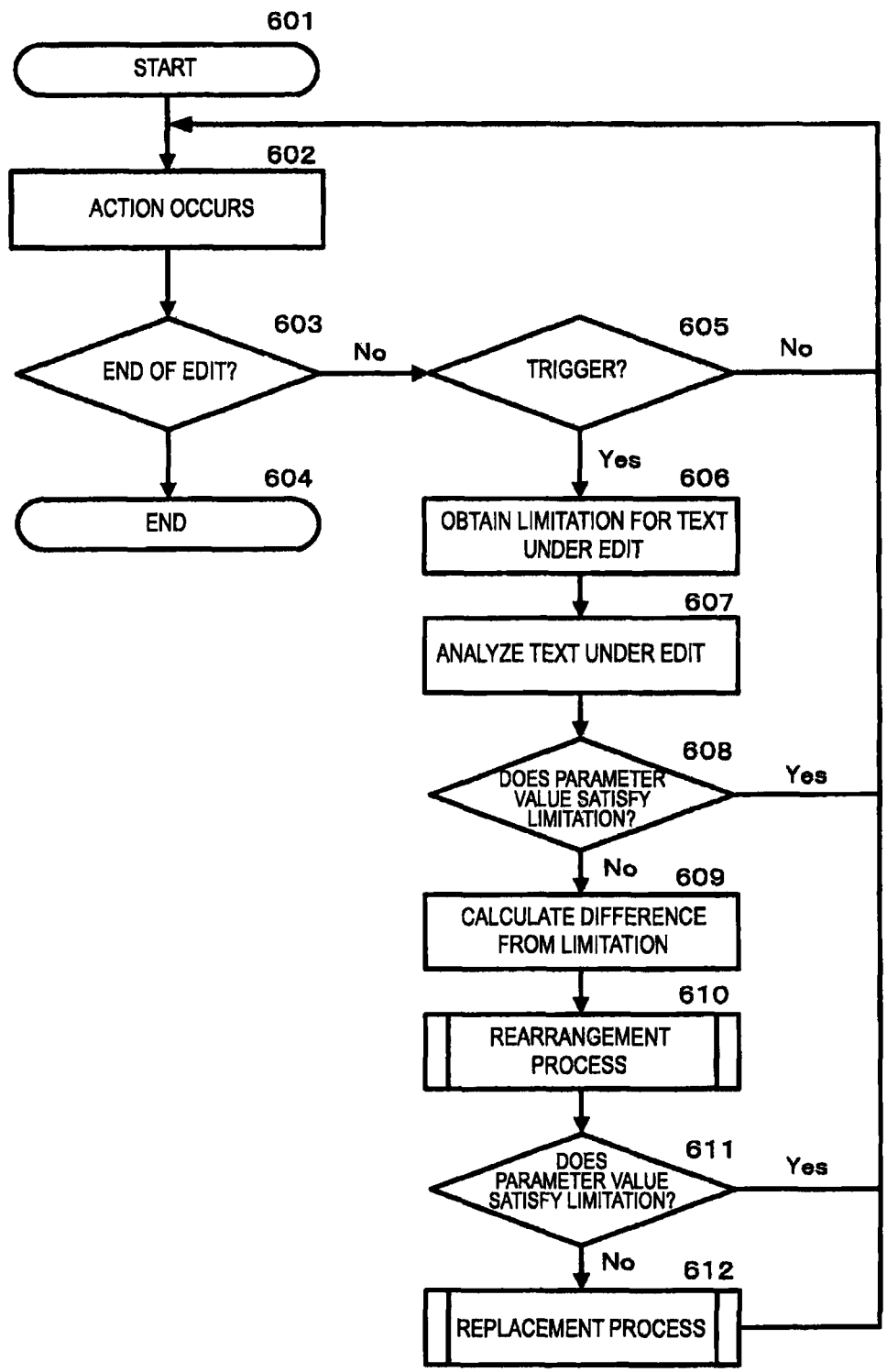
FIG. 6A is a basic flowchart of a process for editing text according to an embodiment.

FIGS. 6A to 6E illustrate flowcharts of a method for editing text according to an embodiment. FIG. 6A illustrates a basic flowchart of a process for editing text according to an embodiment. At block 601, the apparatus (101) starts the process for editing text. The process can be started upon startup of an operating system, or upon start of the software that accepts a text input described above, or upon start of an application for text input, or depression or selection of a menu provided by software that enables text input or text edit, or an FEP. Upon start of the process, a computer program according to an embodiment is loaded from the storage device (108) into the main memory (103). It is assumed here that the user is inputting text through the input unit (201) or is attempting, through the edit unit (202), to text that is being input or has been input. At block 602, the edit unit (202) detects occurrence of an action, for example an input from the user. The input from the user may include an instruction to edit as well as an input of text. At block 603, in response to the action occurred at block 602 being exit from editing, the edit unit (202) forwards the process to block 604 to end the process for text editing. On the other hand, if the action occurred at block 602 is not exit from editing, the edit unit (202) forwards the process to block 604. At block 605, the edit unit (202) determines whether or not the action is an instruction (a trigger) to apply editing. In response to the action being an instruction to apply editing, the edit unit (202) transmits the trigger to the range specification unit (203). Upon receiving the trigger, the range specification unit (203) allows the user to select a text to be edited. The range specification unit (203) may also allow the user to select or specify a particular region in a portion selected as the text to be edited to specify a limitation for the text to be edited. Then the edit unit (202) forwards the process to block 606. On the other hand, in response to the action not being an instruction to apply editing, the edit unit (202) waits for occurrence of the next action (block 602).

At block 606, the change unit (204) dynamically obtains the limitation from the range specification unit (203) or reads a given setting file containing the limitation to obtain the limitation for the text to be edited. At block 607, the change unit (204) analyzes the text under edit to obtain from the text under edit a parameter value required for comparison with the limitation obtained at block 606. The text can be analyzed by using a morphological analysis technique known to those skilled in the art. At block 608, the change unit (204) determines whether or not the result (that is, a parameter value) of the analysis of the text under edit satisfies the limitation obtained at block 606. In response to the parameter value satisfying the limitation obtained at block 606, the change unit (204) returns the process to the edit unit (202), which then waits for occurrence of the next action (block 602). "Satisfying the limitation" means that the parameter value is not beyond the limitation. On the other hand, in response to the parameter value not satisfying the limitation obtained at block 606, the change unit (204) forwards the process to block 609. "Not satisfying the limitation" means that the parameter value is beyond the limit. At block 609, in response to the parameter value not satisfying the limitation obtained at block 606, the change unit (204) calculates the difference between the limitation for the text to be edited and the parameter value. The difference can be expressed in the number of characters or lines, for example.

At block 610, the change unit (204) performs a rearrangement process on a "combination of words, phrases, or a word (s) and phrase(s)". Specifically, if at least one sentence under edit needs to be shortened or lengthened on the basis of the calculated difference, the change unit (204) rearranges a combination of words, phrases or a word(s) and a phrase(s) to decrease or increase the number of characters. The rearrangement is useful when it is difficult to contain all possible combinations of words into a dictionary or when the dictionary is incomplete. The rearrangement process is accomplished by separating a sentence into words (to be exact, words in units that show their parts of speech) and making possible combinations of the words. The rearrangement process will be detailed later with reference to FIGS. 6B and 6C.

Block 611 starts when "all combinations of words have been completed" at block 622 of FIG. 6B or when the "the parameter value satisfies the limitation" at block 630 of FIG.

6B. "All combinations of words have been completed" at block 626 means that the process for obtaining all possible combinations of words has been completed before the parameter values satisfies the limitation. The "Parameter value satisfies the limitation" at block 630 means that the rearrangement process has been performed and the parameter value satisfies the limitation. At block 611, the change unit (204) determines whether or not the result of analysis of the text under edit including the combination of words/phases after the rearrangement process at block 610 (the parameter value) satisfies the limitation obtained at block 606. In response to the parameter value satisfying the limitation obtained at block 606, the change unit (204) returns the process to the edit unit (202), which then waits for occurrence of the next action (block 602). Note that if the result (the parameter value) of analysis of the text under edit including the combination of words/phrase after the rearrangement process satisfies the limitation, the replacement process at block 612 does not need to be performed, because the result of analysis of the text under edit including the combination of words/phrases after the rearrangement process (the parameter value) has already satisfied the limitation. Thus, determination as to whether the parameter value satisfies the limitation is made at both of blocks 630 and 611 in the flowcharts of FIGS. 6A and 6B of one embodiment. On the other hand, in response to the parameter value not satisfying the limitation obtained at block 606, the change unit (204) forwards the process to block 612.

At block 612, in response to the parameter value not satisfying the limitation obtained at block 606, the change unit (204) performs the process for replacing the a word or phrase or a combination of words, phrases or a word(s) and a phrase(s) with another word or phrase or another combination of words, phrases or a word(s) and a phrase(s). Specifically, if at least one sentence under edit needs to be shorten or lengthen on the basis of the difference calculated, the change unit (204) replaces a word or phrase or a combination of words, phrases or a word(s) and a phrase(s) with another word or phrase or another combination of words, phrases or a word(s) and a phrase(s). The replacement process will be detailed later with respect to FIGS. 6D and 6E.

Upon completion of the replacement process at block 612, the change unit (204) returns the process to the edit unit (202), which then waits for occurrence of the next action (block 602). The replacement process at block 612 is completed when "replacement of all words has been completed" at block 655 of FIG. 6D or when "the parameter value satisfies the limitation" at block 659 of FIG. 6D, that is, when the parameter value of the text under edit including the text subjected to the process for replacing a word or phrase or a combination of words, phrase or a word(s) and a phrase(s) satisfies the limitation obtained at block 606. "Replacement of all words has been completed" at block 655 means that the replacement process for all combinations has been completed before the parameter value satisfies the limitation. The "parameter value satisfies the limitation" at block 659 means that the replacement process described above has been performed and the parameter value satisfies the limitation. The change unit (204) optionally passes the process to the replacement unit (205) in order to start the process of the flowchart of FIG. 7.

In the flowchart of FIG. 6A, the replacement process for "combinations of words, phrases or a word(s) and a phrase(s)" is performed before the process for replacing a word or phrase or a combination of words, phrases or a word(s) and a phrase(s) with another word or phrase or another combination of words, phrases or a word(s) and a phrase(s) (612). This is because typically the rearrangement process can more greatly change (increases or decreases) the number characters than the replacement process and therefore performing the process that more greatly changes the number of characters first can minimize the total number of words/phrases or combinations of word(s) and phrase(s) converted by the replacement process. By minimizing the total number of words/phrases or combinations of words/phrases converted by the replacement process, a natural or smooth text can be more reliably retained after the conversion.

As stated above, the replacement is useful when it is difficult to contain all possible combinations of words into a dictionary or when a dictionary is incomplete. However, if all or practically all combinations of words have been contained in the dictionary, the rearrangement process may be omitted and only the replacement process has to be performed, because the rearrangement can be viewed as the replacement. If only the replacement process is performed without performing the rearrangement process, the change unit (204) forwards the process from block 609 to block 612 in FIG. 6A.

Figure 6C:
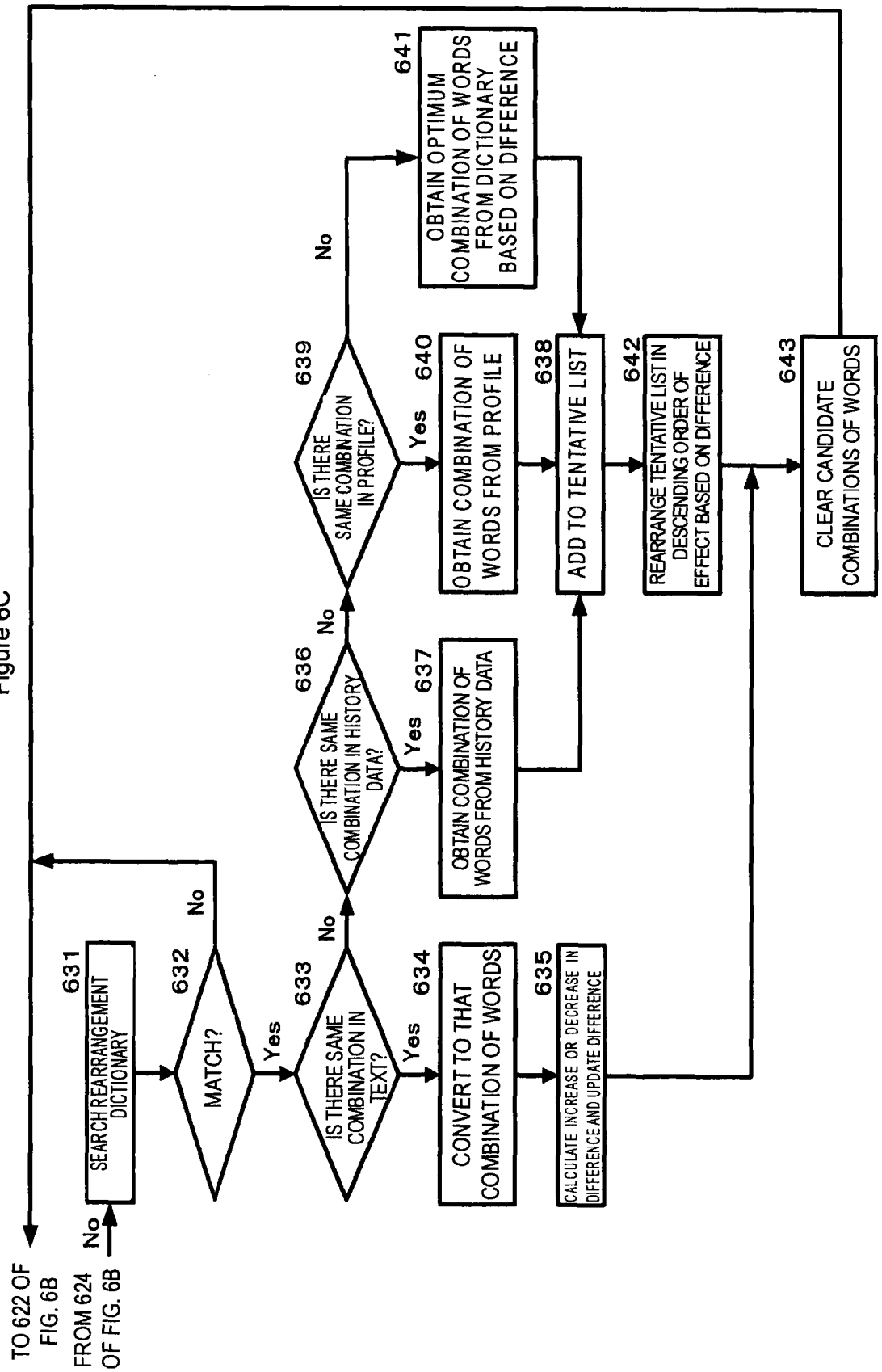
FIG. 6C is a flowchart illustrating in detail the rearrangement process among the blocks of the basic flowchart illustrated in FIG. 6A.

FIGS. 6B and 6C are flowcharts illustrating details of the rearrangement process at block 610 among the blocks of the basic flowchart of FIG. 6A. At block 621, the change unit (204) starts the rearrangement process. At block 622, the change unit (204) extracts words in sequence from the text under edit, starting from the beginning of the text. "Obtain the next word" at block 622 means extracting words, for example the words "show", "clear" and "processes" in this order from the text "show clear processes". At block 623, the change unit (204) adds the extracted words to a candidate combination of words. A candidate combination of words can be a word or phrase or a combination of words, phrases or a word(s) and a phrase(s). At block 624, the change unit (204) determines whether or not all words in the text under edit have been extracted. In response to the completion of extraction of all words in the text under edit, the change unit (204) forwards the process to block 625. On the other hand, in response to extraction of all words in the text under edit not being completed, the change unit (204) forwards the process to block 631 (see FIG. 6C).

At block 625, the change unit (204) obtains a (next) combination of words that is a conversion candidate from a tentative list. The tentative list is a list on which combinations of words obtained through the process from block 632 to the block "Add to tentative list" (block 638) of FIG. 6C are listed in descending order of effect of the arrangement process. In obtaining a combination of words that is a conversion candidate, the change unit (204) extracts and processes first the combination of words at the top of the tentative list, then the combination of words next to the combination of words at the top of the tentative list, and so on.

At block 626, the change unit (204) determines whether or not all "combinations of words" on the tentative list have been have been processed. Specifically, the change unit (204) determines whether or not the text under edit has been divided into words and the rearrangement process has been performed on all combinations of the words. In response to all "combinations of words" being obtained, the change unit (204) forwards the process to block 627, then the rearrangement process ends. On the other hand, in response to not all "combinations of words" have been obtained, the change unit (204) forwards the process to block 628. At block 628, the change unit (204) extracts and converts appropriate combinations of words under edit one by one, the combination at the top of the tentative list obtained at block 625 first, then the one next to that at the top of the tentative list, and so on. At block 629, the change unit (204) compares the text under edit before the rearrangement process with the text currently being edited after the rearrangement process, calculates an increase or decrease in the difference in the number of characters between the texts, and updates the difference.

At block 630, the change unit (204) determines whether or not the result (parameter value) of analysis of the text under edit including the combination of words after the rearrangement satisfies the limitation obtained at block 606. In response to the parameter value satisfying the limitation obtained at block 606, the change unit (204) forwards the process to block 627, then the rearrangement process ends. On the other hand, in response to the parameter value not satisfying the limitation obtained at block 606, the change unit (204) returns the process to block 625 and repeats the replacement process (block 628) on another combination of words, the calculation of the difference (block 629), and determination as to whether the parameter value satisfies the limitation obtained at block 606 (block 630), for combinations of words on the tentative list until the parameter value satisfies the limitation.

At block 631, the change unit (204) searches the rearrangement dictionary (212) to determine whether the arrangement of the parts of speech in the combination of words added as a candidate combination of words at block 623 matches one of the combinations on a rearrangement list in the rearrangement dictionary (212). At block 632, if the arrangement of the parts of speech in the combination of words matches the arrangement of one of the combinations on the list (hereinafter also referred to as conversion candidates) in the rearrangement dictionary (212), the change unit (204) forwards the process to block 633. On the other hand, if the arrangement of the parts of speech in the candidate combination of words matches none of the combinations on the list in the rearrangement dictionary (212), the change unit (204) returns the process to block 622 (FIG. 6B). At block 633, the change unit (204) determines whether or not there is the same combination of words as the conversion candidate in the text under edit or the document being edited. If there is the same combination of words as the conversion candidate in the text under edit or the document being edited, the change unit (204) forwards the process to block 634. On the other hand, if there is not the same combination of words as the conversion candidate in the text under edit, the change unit (204) forwards the process to block 636. Alternatively, if there is not the same combination of words as the conversion candidate in the document being edited, the change unit (204) forwards the process to block 636. If there is the same combination of words as the conversion candidate in the document including the text under edit, the change unit (204) converts the corresponding combination of words in the document being edited to the conversion candidate at block 634.

At block 635, the change unit (204) compares the text under edit before the rearrangement process with the text currently being edited including the conversion candidate after the rearrangement process, calculates an increase or decrease in the difference in the number of characters between the texts, and updates the difference. After calculating the increase or decrease in the difference, the change unit (204) forwards the process to block 643 because the process for the candidate combinations at block 623 has been completed at block 635 and therefore the candidate combinations of words need to be cleared. At block 636, if there is the same combination of words as the conversion candidate in the edit history data (213), the change unit (204) forwards the process to block 637. On the other hand, if there is not the same combination of words as the conversion candidate in the edit history data (213), the change unit (204) forwards the process to block 639.

At block 637, in response to the conversion candidate matching one of the combinations of words in the edit history data (213), the change unit (204) obtains the same conversion candidate from the edit history data (213) and adds the obtained conversion candidate to a tentative list (block 638). The tentative list may be provided, for example, in the storage unit (210) in FIG. 2 or the main memory (103) in FIG. 1. At the time when the obtained conversion candidate is added to the tentative list, the conversion candidate is not yet established and treated as one of conversion candidates to be prioritized on the tentative list. At block 639, if the same combination of words as the conversion candidate is contained or defined in the profile data (214) associated with the user who is editing the document, the change unit (204) forwards the process to block 640. On the other hand, the same combination of words as the conversion candidate is not contained in the profile data (214), the change unit (204) forwards the process to block 641.

At block 640, the change unit (204) obtains the conversion candidate from the profile data (214) and adds the obtained conversion candidate to the tentative list (block 638). If the conversion candidate is not contained in the profile data (214), the change unit (204) obtains an optimum combination of words from the rearrangement dictionary (212) at block 641 on the basis of the difference and adds the obtained optimum combination of words to the tentative list (block 638). Specifically, if the difference from the limitation obtained at block 606 is positive, the change unit (204) selects a conversion candidate that is a shortest combination of words so that the text is shortened. On the other hand, if the difference from the limitation obtained at block 606 is negative, the change unit (204) selects a conversion candidate that is a longest combination of words so that the text is lengthened.

At block 642, the change unit (204) compares the text under edit before the conversion with the text under edit including the conversion candidate and calculates the difference in the number of characters between the texts. Based on the difference, the change unit (204) rearranges the "combinations of words" on the tentative list in descending order of effect. At the block 625 and subsequent blocks in FIG. 6B, the change unit (204) uses the tentative list prepared as described above to perform a replacement process for a combination of words, phases or a word(s) and a phrase(s) by rearrangement using a conversion candidate on the tentative list. Note that rearranging in descending order of effect may be rearranging the conversion candidates in ascending order of the length of the combinations of words that are shorter than the combination of words before the conversion if the text is to be shorten, or rearranging the conversion candidates in descending order of the length of the combinations of words that are longer than the combination of words before the conversion if the text is to be lengthen. At block 643, the change unit (204) clears (deletes) all the candidate combinations of words in block 623 from the work area. After clearing, the change unit (204) returns the process to block 622.

Figure 6D:
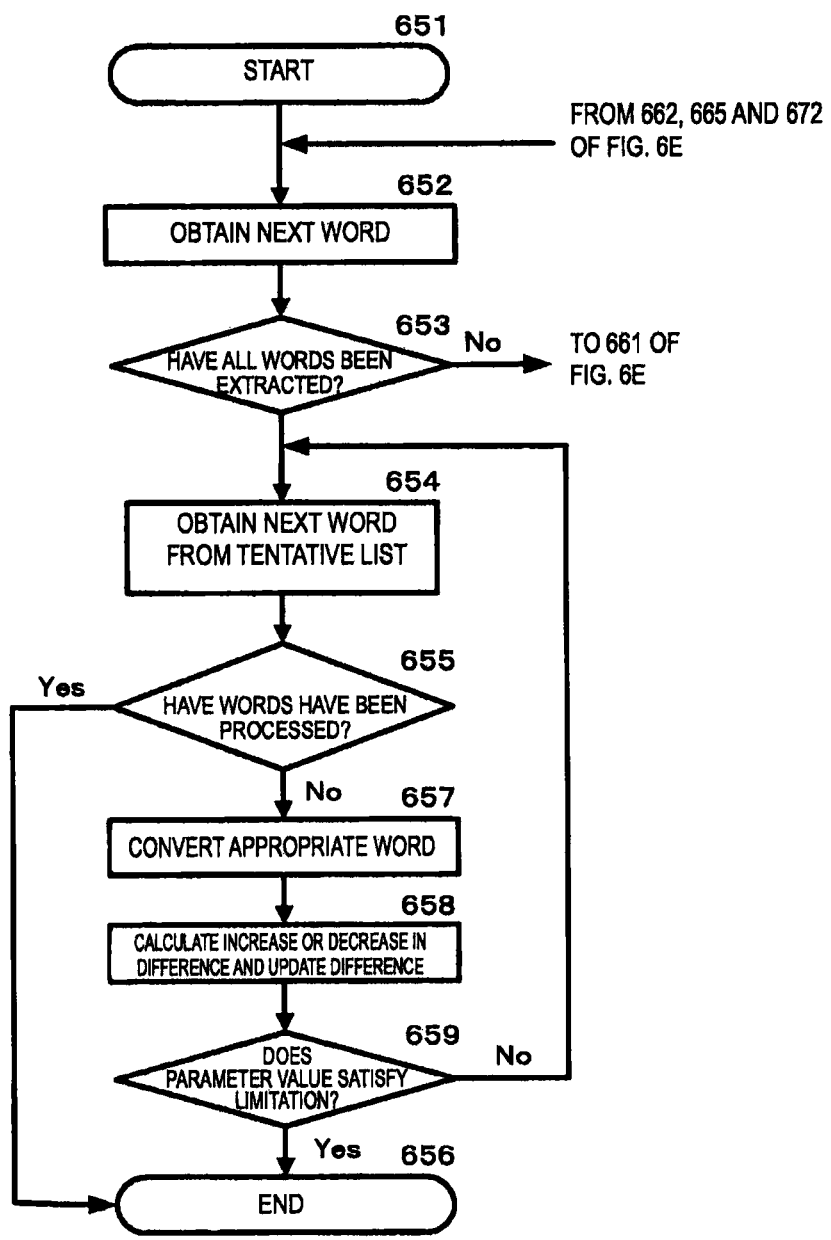
FIG. 6D is a flowchart illustrating in detail a replacement process among the blocks of the basic flowchart illustrated in FIG. 6A.

FIGS. 6D and 6E are flowcharts illustrating details of the replacement process at block 612 among the blocks of the basic flowchart of FIG. 6A. At block 651, the change unit (204) starts the replacement process. At block 652, the change unit (204) extracts words from the text under edit, starting from the beginning of the text. "Obtain next word" at block 652 means extracting, for example, the words, "明白な", "方法", "が", and "わかる" in this order from the text "明白な方法がわかる". At block 653, the change unit (204) determines whether or not all words in the text under edit have been extracted. In response to completing extraction of all the words from the text under edit, the change unit (204) forwards the process to block 654. On the other hand, in response to not completing extraction of the words in the text under edit from the text under edit, the change unit (204) forwards the process to block 661 (see FIG. 6E).

At block 654, the change unit (204) obtains a (next) word that is a conversion candidate from a tentative list. The tentative list is a list on which words obtained through the process from block 662 to block 668 "Add to tentative list" in FIG. 6E are listed in descending order of effect of the replacement process. In obtaining words that are candidate combination, the change unit (204) extracts and processes first the word at the top of the tentative list, then the words next to the word at the top of the tentative list, and so on.

At block 655, the change unit (204) determines whether or not all words on the tentative list have been processed. That is, the change unit (204) determines whether or not the text under edit has been divided into words and the replacement process has been performed for all of the words. In response to all words being obtained, the change unit (204) forwards the process to block 656, then ends the replacement process. On the other hand, in response to not all words being obtained, the change unit (204) forwards the process to block 657. At block 657, the change unit (204) extracts and converts appropriate words under edit on the tentative list obtained at block 654 one by one, at the top of the tentative list first, then the one next to that at the top of the tentative list, and so on. At block 658, the change unit (204) compares the text under edit before the replacement process with the text currently being edited after the replacement process, calculates an increase or decrease in the difference in the number of characters, and updates the difference.

At block 659, the change unit (204) determines whether or not the result of analysis of the text under edit including the word or the combination of words after the replacement process (the parameter value) satisfies the limitation obtained at block 606. In response to the parameter value satisfying the limitation obtained at block 606, the change unit (204) forwards the process to block 656, then ends the replacement process. On the hand, in response to the parameter value not satisfying the limitation obtained at block 606, the change unit (204) returns the process to block 654 and repeats for the words on the tentative list the process for replacing with another word (block 657), calculation of the difference (block 658), and determination as to whether the limitation is satisfied until the parameter value satisfies the limitation obtained at block 606.

At block 661, the change unit (204) searches the word/phrase dictionary (211) for a synonym with or an expression equivalent to the next word obtained at block 652 (which will be referred to as conversion candidate in the following description and FIGS. 6D and 6E). At block 662, if the conversion candidate is found in the word/phrase dictionary (211), the change unit (204) forwards the process to block 663. On the other hand, if the conversion candidate is not found in the word/phrase dictionary (211), the change unit (204) returns the process to block 652 (FIG. 6D).

At block 663, the change unit (204) determines whether or not the same word as the conversion candidate is in the text including the text under edit or in the document under edit. If the same word as the conversion candidates is in the text including the text under edit or in the document under edit, the change unit (204) forwards the process to block 664. On the other hand, if the same word as the obtained next word is not in the text including the text under edit, the change unit (204) forwards the process to block 666. Alternatively, if the same word as the conversion candidate is not in the document under edit, the change unit (204) forwards the process to block 666.

At block 664, if the same word as the conversion candidate is in the document including the text under edit, the change unit (204) converts the corresponding word in the text under edit to the candidate. At block 665, the change unit (204) compares the text under edit before the replacement process with the current text under edit including the conversion candidate after the replacement process, computes an increase or decrease in the difference in the number of characters, and updates the difference. After calculating the increase or decrease in the difference, the change unit (204) returns the process to block 652.

At block 666, if the same word as the conversion candidate is in the edit history data (213), the change unit (204) forwards the process to block 667. On the other hand, if the same word as the obtained next word is not in the edit history data (213), the change unit (204) forwards the process to block 669. At block 667, the change unit (204) obtains the same word as the conversion candidate from the edit history data (213) and adds the obtained conversion candidate to a tentative list (block 668). The tentative list may be provided in the storage unit (210) in FIG. 2 or the main memory (103) in FIG. 1, for example.

At block 669, if the same word as the conversion candidate is contained or defined in the profile data (214) associated with the user who is editing the text, the change unit (204) forwards the process to block 670. On the other hand, if the same word as the conversion candidate is not contained in the profile data (214), the change unit (204) forwards the process to block 671. At block 670, the change unit (204) obtains the conversion candidate from the profile data (214) and adds the obtained conversion candidate to the tentative list (block 668).

At block 671, if the conversion candidate is not contained in the profile data (214), the change unit (204) obtains an optimum word from the word/phrase dictionary (211) on the basis of the difference and adds the obtained optimum word to the tentative list (block 668). Specifically, if the difference from the limitation obtained at block 606 is positive, the change unit (204) selects a short word or a short combination of words as a conversion candidate so as to shorten the text. On the other hand, if the difference from the limitation obtained at block 606 is negative, the change unit (204) selects a long word or a long combination of words so as to lengthen the text.

At block 672, the change unit (204) compares the text under edit before the conversion with the text under edit including the conversion candidate and calculates the difference in the number of characters between the texts. Based on the difference, the change unit (204) rearranges the word or combinations of words on the tentative list in descending order of effect. At the block 654 and subsequent blocks in FIG. 6D, the change unit (204) uses the tentative list prepared as described above to perform a replacement process for a word or phrase or a combination of words, phases or a word(s) and a phrase(s) by replacement using a conversion candidate on the tentative list. Note that rearranging in descending order of effect may be rearranging the conversion candidates in ascending order of the length of the words or combinations of words that are shorter than the word or combination of words before the conversion if the text is to be shorten, or rearranging conversion candidates in descending order of the length of the words or combinations of words that are longer than the word or combination of words before the conversion if the text is to be lengthen. Upon completion of the rearrangement or combinations of words on the tentative list, the change unit (204) returns the process to block 652.

Note that the term "word" in FIGS. 6D and 6E can be replaced with the term "word or phrase" or the term "combination of words, phases or a word(s) and a phrase(s)" to perform the replacement process on a "word or phrase" or a "combination of words, phrases or a word(s) and a phrase(s)" as a unit and, as stated earlier, the replacement process may be omitted. By editing text according to the flowcharts illustrated in FIGS. 6A to 6E, the efficiency of document preparation can be improved.

Figure 7:
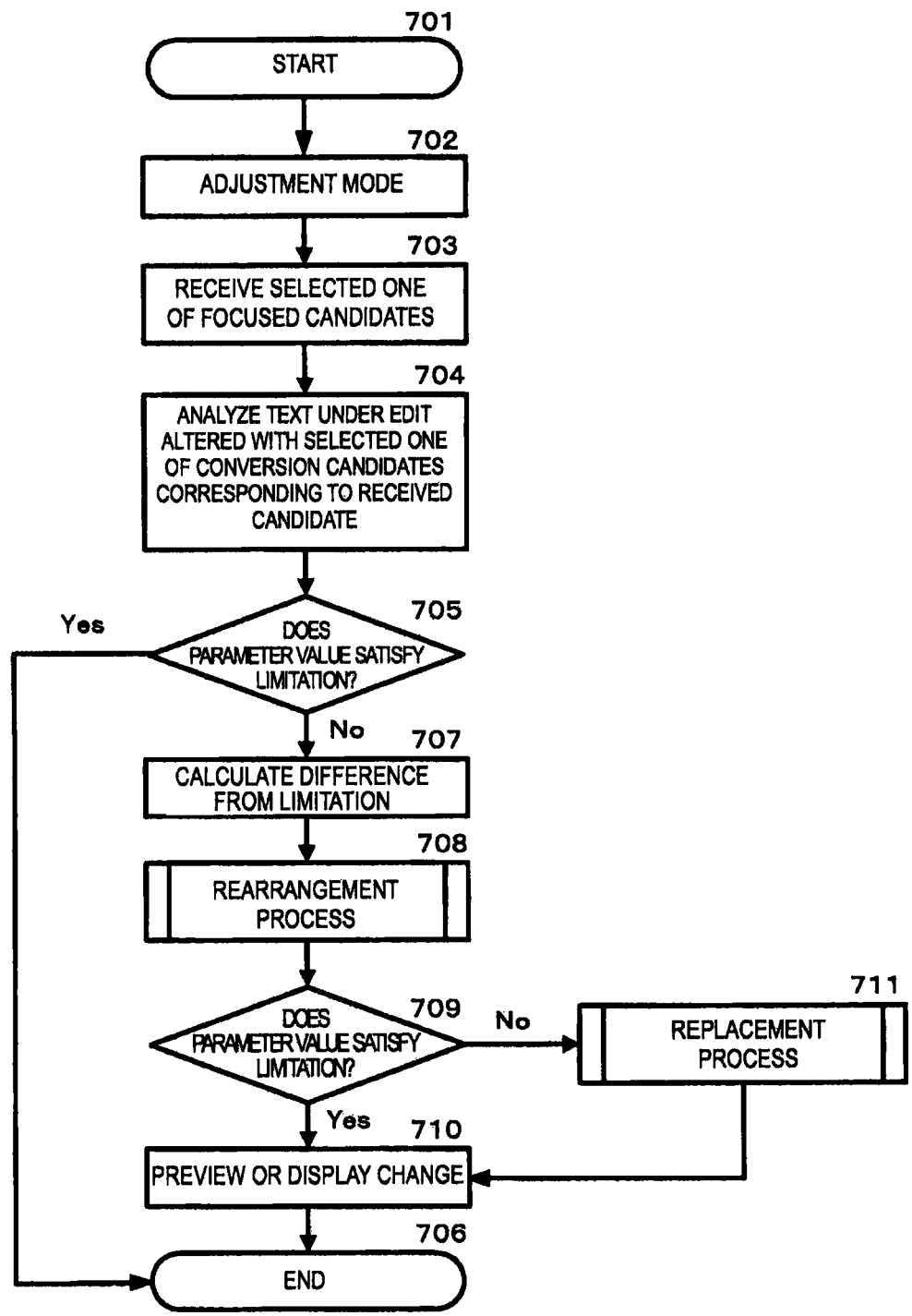
FIG. 7 is a basic flowchart of a process for adjustment to change a phrase or a combination of words, phrases, or a word(s) and a phrase(s) in an automatically changed portion of text edited according to the basic flowchart illustrated in FIG. 6A to a further different word or phrase or a combination of words, phrases, or a word(s) and a phrase(s).

FIG. 7 illustrates a flowchart which is the basis for a process for adjusting text edited according to the basic flowchart of FIG. 6A to further change an automatically changed word or phrase or an automatically changed combination of words, phrases or a word(s) and a phrase(s) to another word or phrase or another combination of words, phrases or a word(s) and a phrase. At block 701, the replacement unit (205) starts the adjustment process. The process can be performed immediately after block 612 of FIG. 6A. At block 702, the replacement unit (205) goes into an adjustment mode. The adjustment mode includes visualizing words or phrases or combinations of words, phrase or a word(s) and a phrase(s) changed by the process illustrated in FIGS. 6A to 6D, allowing one of the visualized words or phrase, or combinations of words, phrases or a word(s) and a phrase(s) to be selected, and displaying another word or phrase or another combination of words, phrases or a word(s) and a phrase(s) that can hold the same semantic content as the selected word or phrase or the selected combination of words, phrases or a word(s) and a phrase(s) (for example a synonym or an equivalent expression) as a conversion candidate.

Upon switch to the adjustment mode, the visualization unit (207) visualizes words or phrases or combinations of words, phrases or a word(s) and a phrase(s) changed by the process illustrated in FIG. 6A to 6E (a second word or phrase, a fourth word or phrase, a fifth word or phrase). The visualization may be making the changed words or phrases or combinations or words and phrases or a word(s) and a phrase(s) appear in a different color, in boldface, underlined, or against a background in a different color, for example, though those skilled in the art can choose any kind of visualization as appropriate according to the size of the display of the apparatus. The visualization gives focus to words, phrases, or combinations of words, phrases or a word(s) and a phrase(s) changed by a user through the process illustrated in the FIGS. 6A to 6E. Hereinafter, a word or phrase or a combination of words, phrases or a word(s) and a phrase(s) changed by a user through the process illustrated in FIGS. 6A to 6E is also referred to as "a focused word or phrase or a focused combination of words, phrases or a word(s) and a phrase(s)".

The selection unit (206) allows the user to select one of the focused words or phrases or focused combinations of words, phrases or a word(s) and a phrase(s) (that is, focused candidates). The replacement unit (205) refers to the word/phrase dictionary (211), the rearrangement dictionary (212), the edit history data (213) and/or the profile data (214) to obtain conversion candidates corresponding to the selected one of the focused candidates. The replacement unit (205) then displays the conversion candidates in a popup window, for example (see for example the popup window 332 in FIG. 3D, the popup window 342 in FIG. 3E, the popup window 432 in FIG. 4D, and the popup window 442 in FIG. 4E) in such a way that it can be seen that the conversion candidates are associated with the selected one.

The conversion candidate may include at least one of the following items: a word or phrase or a combination of words, phrases or a word(s) and a phrase(s) in at least one text under edit before the word or phrase of the combination (corresponding to a second word or phrase, a fourth word or phrase, a fifth word or phrase) is changed to another word or phrase or another combination of words, phrase or a word(s) and a phrase(s) (corresponding to a first word or phrase, a third word or phrase and a fourth word or phrase, respectively); if another word or phrase or another combination of words, phrases or a word(s) and a phrase(s) is selected by a user editing the sentence during editing of the document as a conversion candidate for the second word or phrase, the fourth word or phrase or the sixth word or phrase, the other word or phrase or the other combination of words, phrases or a word(s) and a phrase(s) selected by the user during editing of the document; if another word or phrase or another combination of words, phrases or a word(s) and a phrase(s) has been selected by a user editing the sentence during editing of another document in the past as a conversion candidate for the second word or phrase, the fourth word or phrase or the sixth word or phrase, the other word or phrase or the other combination of words or phrases or a word(s) and a phrase(s) selected by the user during editing of the other document in the past; one word or phrase or one combination of words or phrases or a word(s) and a phrase(s) in a profile which is defined for the user editing the sentence and in which a word or phrase or a combination of words, phrases or a word(s) and a phrase(s) preferred by the user is registered; if the selected conversion candidate has more characters or words than the selected word or phrase, one word or phrase or one combination of words, phrases or a word(s) and a phrase(s) that has the fewest characters or words among synonymous words or phrases or synonymous combinations of words, phrases or a word(s) and a phrase(s) registered in a word/phrase dictionary; if the selected conversion candidate has fewer characters or words than the selected word or phrase, one word or phrase or one combination of words and phrases or a word(s) and a phrase(s) that has the most characters among synonymous words or phrases or among synonymous combinations of words, phrases or a word(s) and a phrase(s) registered in a word/phrase dictionary; if the selected conversion candidate has more characters or words than selected word or phrase, one word or phrase or one combination of words, phrases or a word(s) or a phrase(s) among synonymous words or phrases or among synonymous combinations of words, phrases or a word(s) and a phrase(s) arranged in ascending order of the number of characters or words registered in a word/phrase dictionary; and if the selected conversion candidate has fewer characters or words than selected word or phrase, one word or phrase or one combination of words, phrases or a word(s) or a phrase(s) among synonymous words or phrases or among synonymous combinations or words, phrases or a word(s) and a phrase(s) arranged in descending order of the number of characters in a word/phrase dictionary.

The user can use the selection unit (206), for example a mouse or cursor, to select one of the focused candidates. At block 703, the replacement unit (205) receives one (word or phrase or one combination of words, phrase or a word(s) and a phrase(s)) of the candidates selected by the user from the selection unit (206).

At block 704, the replacement unit (205) analyzes the text under edit altered by the replacement with the selected replacement candidate and obtains, from the text altered by the replacement with the replacement candidate, a parameter value to be compared with the limitation obtained at block 606. The analysis of the text under edit can be performed by using any appropriate morphological analysis technique. At block 705, the replacement unit (205) determines whether or not the result (the parameter value) of the analysis of the text under edit altered by the replacement with the selected replacement candidate satisfies the limitation obtained at block 606. In response to the parameter value satisfying the limitation obtained at block 606, the replacement unit (205) forwards the process to block 706, then ends the adjustment process. On the other hand, in response to the upper parameter value not satisfying the limitation obtained at block 606, the replacement unit (205) forwards the process to block 707.

At block 707, in response to the parameter value not satisfying the limitation obtained at block 606, the replacement unit (205) calculates the difference between the limitation and the parameter value of the text under edit. The difference can be expressed in the number of characters or lines, for example. At block 708, the replacement unit (205) performs the rearrangement process for a "combination of words, phrases or a word(s) and a phrase(s)". Specifically, based on the difference calculated, if at least one sentence under edit altered by the replacement with the selected replacement candidate needs to be shortened or lengthened, the replacement unit (205) rearranges the combination of words, phrases or a word(s) and a phrase(s) to decrease or increase the number of characters. Details of the rearrangement process have been described with respect to FIGS. 6B and 6C.

Block 709 is started when "all combinations of words have been completed" at block 626 of FIG. 6B, or when the "parameter value satisfies the limitation" at block 630 of FIG. 6B, that is, when the parameter value of the text under edit including text after the process for rearranging a combination of word(s)/phrase(s) satisfies the limitation obtained at block 606. At block 709, the replacement unit (205) determines whether or not the result of analysis of the text under edit including the combination of word(s)/phrase(s) after the rearrangement process at block 708 satisfies the limitation obtained at block 606. In response to the parameter value satisfying the limitation obtained at block 606, the replacement unit (205) forwards the process to block 710. On the other hand, in response to the parameter value not satisfying the limitation obtained at block 606, the replacement unit (205) forwards the process to block 711.

At block 711, in response to the parameter value not satisfying the limitation obtained at block 606, the replacement unit (205) performs the process for replacing a word or phrase or a combination of words, phrases or a word(s) and a phrase(s) in the text under edit with another word or phrase or another combination of words, phrases or a word(s) and a phrase(s). That is, based on the calculated difference, if at least one sentence under edit needs to be shorten or lengthen, the replacement unit (205) replaces a word or phrase or a combination of words, phrases or a word(s) and a phrase(s) with another word or phrase or another combination of words or phrases or word(s) and a phrase(s). Details of the replacement process have been described with reference to FIGS. 6D and 6E.

Block 710 starts in response to the result (the parameter value) of analysis of the text under edit altered by replacement with the selected replacement candidate satisfying, at block 709, the limitation obtained at block 606, or in response to the end of the replacement process at block 711. At block 710, the display unit (208) displays a preview of the text under edit after the rearrangement process (from block 709) or the text under edit after the replacement process (block 711) on the display screen. The preview may be designed to be presented to a user to allow the user to determine whether to accept the text under edit including a rearranged combination of words, phrases or a word(s) and a phrase(s) or the text under edit including a replaced word or phrase or a replaced combination of words, phrases or a word(s) and a phrase(s). That is, the text under edit including a rearranged combination of words, phrases or a word(s) and a phrase(s) or the text under edit including a replaced word or phrase or a replaced combination of words, phrases or a word(s) and a phrase(s) is not yet established. Alternatively, the display unit (208) may display, on the display screen, text under edit that includes a rearranged combination of words, phrases or a word(s) and a phrase(s) and has been automatically established (from block 709) or text including a replaced word or phrase and has been automatically established (block 711).

In response to the previewed text under edit being confirmed by the user, the replacement unit (205) ends the adjustment process (block 706). Alternatively, the replacement unit (205) may end the adjustment process at block 706 after the text under edit established automatically has been displayed for a certain duration (block 706).

In the flowchart of FIG. 7, as in the flowchart of FIG. 6A, the rearrangement process on a "combination of words, phrases or a word(s) and a phrase(s)" (610) is performed before the process for replacing a word or phrase or a combination of words, phrases or a word(s) and a phrase(s) to another word or phrase or another combination of words, phrases or a word(s) and a phrase(s) (612). The reason is the same as stated above. Editing text obtained as a result of the process illustrated in the basic flowchart of FIG. 6A according to the flowchart of FIG. 7A can avoid the risk of inconsistency in the text including a word or phrase or a combination of words, phrases or a word(s) and a phrase(s) after the edit.

Technical effects and benefits include automatic editing of text given a predetermined limitation or range for the text.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, blocks, operations, elements, and/or components, but do not preclude the presence or addition of one or more other features, integers, blocks, operations, elements, components, and/or groups thereof.

The corresponding structures, materials, acts, and equivalents of all means or block plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational blocks to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for editing text, comprising:
   in response to an instruction to apply editing to at least one sentence within a document that is displayed on a display screen changing a first word or phrase in the at least one sentence for a second word or phrase while maintaining semantic content of the first word or phrase and such that the at least one sentence falls within a predetermined range, wherein the changing the first word or phrase comprises one of:
      in response to the second word or phrase having more characters or words than the first word or phrase, changing a third word or phrase within the at least one sentence including the second word or phrase for a fourth word or phrase, such that the at least one sentence including the second word or phrase falls within the predetermined range; and
      in response the second word or phrase having fewer characters or words than the first word or phrase, changing a fifth word or phrase within the at least one sentence including the second word or phrase for a sixth word or phrase, such that the at least one sentence including the second word or phrase falls within the predetermined range; and
   displaying the at least one sentence including the second word or phrase, and one of the fourth word or phrase and the sixth word or phrase, on the display screen.

2. The method according to claim 1, wherein displaying the at least one sentence including the second word or phrase on the display screen comprises displaying at least one of the second word or phrase, the fourth word or phrase, and the sixth word or phrase to a user; the method further comprising:

in response to at least one of the second word or phrase, the fourth word or phrase and the sixth word or phrase being selected by the user, displaying on the display screen a conversion list indicating at least one conversion candidate that maintains the semantic content of the selected word or phrase; and in response to a conversion candidate on the conversion list being selected by the user, replacing the selected word or phrase with the conversion candidate selected by the user.

3. The method according to claim 2, wherein the replacing further comprises, in response to one of the conversion candidate being selected by the user, one of:

if the selected conversion candidate has more characters or words than the selected word or phrase, indicating that a seventh word or phrase in the at least one sentence including the selected conversion candidate that is not the selected conversion candidate, or that an eighth word or phrase in another sentence that does not include the selected conversion candidate, may be changed to a ninth word or phrase that has fewer characters or words than the selected conversion candidate, such that the at least one sentence including the selected conversion candidate falls within the predetermined range, and changing the seventh word or phrase or the eighth word or phrase to the ninth word or phrase; and if the selected conversion candidate has fewer characters or words than the selected word or phrase, indicating that a tenth word or phrase in the at least one sentence including the selected conversion candidate that is not the selected conversion candidate, or that an eleventh word or phrase in another sentence that does not include the selected conversion candidate may be changed to a twelfth word or phrase having more characters or words than the selected conversion candidate, such that the at least one sentence including the selected conversion candidate falls within the predetermined range, and changing the tenth word or phrase or the eleventh word or phrase to the twelfth word or phrase.

4. The method according to claim 3, wherein a minimum number of combinations of expressions are replaced with the ninth word or phrase; or a minimum number of combinations of expressions are replaced with the twelfth word or phrase.

5. The method according to claim 3, wherein, if the seventh word or phrase is changed to the ninth word or phrase, the ninth word or phrase has the fewest characters or words that are registered in a word/phrase dictionary and synonymous with the seventh word or phrase; or if the eighth word or phrase is changed to the ninth word or phrase, the ninth word or phrase has the fewest characters or words that are registered in the word/phrase dictionary and are synonymous with the eighth word or phrase; or if the tenth word or phrase is changed to the twelfth word or phrase, the twelfth word or phrase has the most characters or words that are registered in the word/phrase dictionary and synonymous with the tenth word or phrase; or if the eleventh word or phrase is changed to the twelfth word or phrase, the twelfth word or phrase has the most characters or words that are registered in the word/phrase dictionary and synonymous with the eleventh word or phrase.

6. The method according to claim 3, further comprising at least one of:

changing every word or phrase in the at least one sentence that is the same as a word or phrase selected by the user to a conversion candidate selected by the user;

changing every word or phrase in the document that is the same as the seventh word or phrase, or every word or phrase in the document that is the same as the eighth word or phrase, to the ninth word or phrase; and changing every word or phrase in the document that is the same as the tenth word or phrase, or every word or phrase in the document that is the same as the eleventh word, to the twelfth word or phrase.

7. The method according to claim 2, wherein the conversion candidate comprises at least one of:

the first word or phrase before being changed to the second word or phrase;

the third word or phrase before being changed to the fourth word or phrase;

the fourth word or phrase before being changed to the sixth word or phrase;

if another word or phrase is selected by a user editing the at least one sentence during editing of the document as a conversion candidate for the second word or phrase, the fourth word or phrase or the sixth word or phrase, the another word or phrase selected by the user during editing of the document;

if another word or phrase has been selected by a user editing the at least one sentence during editing of another document in the past as a conversion candidate for the second word or phrase, the fourth word or phrase or the sixth word or phrase, the another word or phrase selected by the user during editing of the another document in the past;

a word or phrase in a profile which is defined for the user editing the at least one sentence;

if the selected conversion candidate has more characters or words than the selected word or phrase, a word or that has the fewest characters or words in one set of synonymous words or phrases registered in a word/phrase dictionary;

if the selected conversion candidate has fewer characters or words than the selected word or phrase, a word or phrase that has the most characters in one set of synonymous words or phrases registered in the word/phrase dictionary;

if the selected conversion candidate has more characters or words than selected word or phrase, a word or phrase in a set of synonymous words or phrases arranged in ascending order of number of characters or words registered in the word/phrase dictionary; and if the selected conversion candidate has fewer characters or words than selected word or phrase, a word or phrase in a set of synonymous words or phrases arranged in descending order of number of characters in the word/phrase dictionary.

8. The method according to claim 1, wherein the changing comprises one of:

shortening the at least one sentence so that the at least one sentence falls within the predetermined range; and lengthening the at least one sentence so that the at least one sentence falls within the predetermined range.

9. The method according to claim 1, wherein the at least one sentence includes a first sentence and a second sentence that is different from the first sentence such that the third word or phrase is in the first sentence and the fourth word or phrase is in the second sentence; or the at least one sentence further includes a third sentence and a fourth sentence different from the third sentence such that the fourth word or phrase is in the third sentence and the fifth word is in the fourth sentence.

10. The method according to claim 1, wherein the instruction to apply the editing is issued in response to changing of at least one of a size or a position of a display range selected by a user as a portion to be edited out of at least one sentence displayed on the display screen.

11. The method according to claim 1, wherein the instruction to apply editing is issued in response to at least one of:

a number of input characters, words, lines, paragraphs, pages or columns in the document, or a number of characters or words in one line of the document, exceeding a predetermined upper limit;

completion of input a sentence in the document;

pasting a sentence or a portion of a sentence into the document;

if the predetermined range is a display range, changing at least one of a size or a position of the display range;

if the predetermined range is a display range, moving the display range to a region adjacent to a graphic object embedded in the document;

inputting the instruction to apply editing by a user; and if the at least one sentence is an electronic mail or a message, receiving an instruction to send the electronic mail or an instruction to post the message.

12. The method according to claim 11, wherein the change of a size of the display range comprises a change of a least one of the number of characters, a number of words, a number of lines, a number of paragraphs, a number of pages, a number of columns, a setting of a document sheet, a portrait/landscape print orientation, a direction of a character string, a number of characters or words per line, a margin of a page, and a double-byte or a single-byte character input.

13. The method according to claim 11, wherein the change of the position of the display range comprises movement of the display range.

14. The method according to claim 1, wherein the predetermined range is predetermined based on at least one of a specified number of characters, words, lines, paragraphs, pages, columns, characters per line, and words per line; a line spacing, a margin of a page, a size of a paper sheet, a font, a font size, a character spacing, and a particular display range capable of displaying text specified by a user.

15. The method according to claim 1, further comprising at least one of:

changing each word or phrase in the document or in the at least one sentence that is the same as the first word or phrase to the second word or phrase;

changing every word or phrase in the document or in the at least one sentence that is the same as the third word or phrase to the fourth word or phrase; and changing every word or phrase in the document or in the at least one sentence that is the same as the fifth word or phrase to the sixth word or phrase.

16. The method according to claim 1, further comprising changing the third word or phrase to the fourth word such that a number of characters in the at least one sentence including the second word or phrase is less than a maximum number of characters of the predetermined range; or changing the fifth word or phrase to the sixth word or phrase such that a number of characters in the at least one sentence including the second word or phrase is greater than a minimum number of characters of the predetermined range.

17. A system for editing text, the system comprising:

a processor; and a display screen, the system configured to perform a method comprising:

in response to an instruction to apply editing to at least one sentence within a document that is displayed on a display screen, changing, by the processor, a first word or phrase in the at least one sentence for a second word or phrase while maintaining semantic content of the first word or phrase and such that the at least one sentence falls within a predetermined range, wherein the changing the first word or phrase comprises one of:

in response to the second word or phrase having more characters or words than the first word or phrase, changing a third word or phrase within the at least one sentence including the second word or phrase for a fourth word or phrase, such that the at least one sentence including the second word or phrase falls within the predetermined range; and in response the second word or phrase having fewer characters or words than the first word or phrase, changing a fifth word or phrase within the at least one sentence including the second word or phrase for a sixth word or phrase, such that the at least one sentence including the second word or phrase falls within the predetermined range; and displaying, by the processor, the at least one sentence including the second word or phrase, and one of the fourth word or phrase and the sixth word or phrase, on the display screen.

18. The system according to claim 17, wherein displaying the at least one sentence including the second word or phrase on the display screen comprises displaying at least one of the second word or phrase, the fourth word or phrase, and the sixth word or phrase to a user; the method further comprising:

in response to at least one of the second word or phrase, the fourth word or phrase and the sixth word or phrase being selected by the user, displaying on the display screen a conversion list indicating at least one conversion candidate that maintains the semantic content of the selected word or phrase; and in response to a conversion candidate on the conversion list being selected by the user, replacing the selected word or phrase with the conversion candidate selected by the user.

19. A computer program product for editing text, the computer program product comprising a non-transitory computer readable storage medium having computer readable program code embodied therewith, the computer readable program code comprising computer readable program code configured to:

in response to an instruction to apply editing to at least one sentence within a document that is displayed on a display screen, changing a first word or phrase in the at least one sentence for a second word or phrase while maintaining semantic content of the first word or phrase and such that the at least one sentence falls within a predetermined range, wherein the changing the first word or phrase comprises one of:

in response to the second word or phrase having more characters or words than the first word or phrase, changing a third word or phrase within the at least one sentence including the second word or phrase for a fourth word or phrase, such that the at least one sentence including the second word or phrase falls within the predetermined range; and in response the second word or phrase having fewer characters or words than the first word or phrase, changing a fifth word or phrase within the at least one sentence including the second word or phrase for a sixth word or phrase, such that the at least one sentence including the second word or phrase falls within the predetermined range; and displaying the at least one sentence including the second word or phrase, and one of the fourth word or phrase and the sixth word or phrase, on the display screen.

20. The computer program product according to claim 19, wherein displaying the at least one sentence including the second word or phrase on the display screen comprises displaying at least one of the second word or phrase, the fourth word or phrase, and the sixth word or phrase to a user; the method further comprising:

in response to at least one of the second word or phrase, the fourth word or phrase and the sixth word or phrase being selected by the user, displaying on the display screen a conversion list indicating at least one conversion candidate that maintains the semantic content of the selected word or phrase; and in response to a conversion candidate on the conversion list being selected by the user, replacing the selected word or phrase with the conversion candidate selected by the user.

\* \* \* \* \*